US012531693B2

United States Patent
Huang et al.

(10) Patent No.: US 12,531,693 B2
(45) Date of Patent: Jan. 20, 2026

(54) SOUNDING REFERENCE SIGNAL PORT ENHANCEMENTS FOR UPLINK TRANSMISSIONS

(71) Applicant: QUALCOMM Incorporated, San Diego, CA (US)

(72) Inventors: Yi Huang, San Diego, CA (US); Wanshi Chen, San Diego, CA (US); Muhammad Sayed Khairy Abdelghaffar, San Jose, CA (US); Yu Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 17/875,334

(22) Filed: Jul. 27, 2022

(65) Prior Publication Data

US 2024/0039670 A1 Feb. 1, 2024

(51) Int. Cl.
*H04L 5/00* (2006.01)
*H04L 27/26* (2006.01)
*H04W 72/23* (2023.01)

(52) U.S. Cl.
CPC .......... *H04L 5/0051* (2013.01); *H04L 27/261* (2013.01); *H04W 72/23* (2023.01)

(58) Field of Classification Search
CPC ..... H04L 5/0051; H04L 27/261; H04L 5/261; H04W 72/23–232
USPC .......................................................... 370/329
See application file for complete search history.

(56) References Cited

U.S. PATENT DOCUMENTS

| | | | | |
|---|---|---|---|---|
| 2011/0134849 | A1* | 6/2011 | Lee | H04B 7/0671 |
| | | | | 370/328 |
| 2017/0141900 | A1* | 5/2017 | McCoy | H04W 72/542 |
| 2021/0083824 | A1* | 3/2021 | Wernersson | H04L 5/0051 |
| 2021/0083825 | A1* | 3/2021 | Choi | H04L 5/0023 |
| 2022/0116891 | A1* | 4/2022 | Yao | H04W 52/42 |
| 2022/0173865 | A1* | 6/2022 | Maamari | H04W 72/23 |
| 2023/0045052 | A1* | 2/2023 | Sun | H04L 27/2605 |
| 2023/0421414 | A1* | 12/2023 | Sun | H04L 5/0023 |
| 2024/0031103 | A1* | 1/2024 | Liu | H04L 5/0048 |
| 2024/0372675 | A1* | 11/2024 | Zheng | H04L 5/0051 |

FOREIGN PATENT DOCUMENTS

WO WO-2023206104 A1 * 11/2023 ............ H04W 28/18

* cited by examiner

*Primary Examiner* — Kevin C. Harper
(74) *Attorney, Agent, or Firm* — Holland & Hart LLP

(57) ABSTRACT

Methods, systems, and devices for wireless communications are described. A user equipment (UE) may receive, from a network entity, control signaling that includes sounding reference signal (SRS) configuration information associated with an increased quantity of SRS ports. The SRS configuration information may include a quantity of symbols via which to transmit SRSs, a frequency resource comb for each respective symbol, and a threshold quantity of cyclic shifts. The UE may map a first subset of SRS ports to a first symbol and map a second subset of SRS ports to a second symbol. The UE may transmit, and the network entity receive, the SRSs using the first subset of SRS ports via the first symbol according to a first frequency resource comb and respective cyclic shifts and using the second subset of SRS ports via the second symbol according to a second frequency resource comb and respective cyclic shifts.

30 Claims, 17 Drawing Sheets

SOUNDING REFERENCE SIGNAL PORT ENHANCEMENTS FOR UPLINK TRANSMISSIONS

TECHNICAL FIELD

The following relates to wireless communications, including sounding reference signal port enhancements for uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications, the UE may transmit sounding reference signals (SRSs) to a network entity, such that the network entity may estimate uplink channel quality.

SUMMARY

The described techniques relate to improved methods, systems, devices, and apparatuses that support sounding reference signal (SRS) port enhancements for uplink transmissions. For example, the described techniques provide for a user equipment (UE) to sound an increased quantity (e.g., eight) of SRS ports, thereby enabling the UE to transmit an increased quantity of transmission layers. For example, the UE may receive control signaling that includes SRS configuration information. The SRS configuration information may indicate a quantity of orthogonal frequency division multiplexing (OFDM) symbols via which to transmit the SRSs. Additionally, the SRS configuration information may include a frequency resource comb, of a quantity of frequency resource combs, for each respective symbol and a threshold quantity of cyclic shifts. The UE may map the SRS ports to frequency resource combs across one or more OFDM symbols and transmit the SRS ports according to a respective cyclic shift.

A method for wireless communications at a user equipment (UE) is described. The method may include receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols, mapping a first subset of SRS ports of the set of multiple SRS ports to a first symbol of the quantity of symbols and a second subset of SRS ports of the set of multiple SRS ports to a second symbol of the quantity of symbols, and transmitting sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

An apparatus for wireless communications at a UE is described. The apparatus may include at least one processor, memory coupled with the at least one processor, and instructions stored in the memory. The instructions may be executable by the at least one processor to cause the apparatus to receive control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols, map a first subset of SRS ports of the set of multiple SRS ports to a first symbol of the quantity of symbols and a second subset of SRS ports of the set of multiple SRS ports to a second symbol of the quantity of symbols, and transmit sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

Another apparatus for wireless communications at a UE is described. The apparatus may include means for receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols, means for mapping a first subset of SRS ports of the set of multiple SRS ports to a first symbol of the quantity of symbols and a second subset of SRS ports of the set of multiple SRS ports to a second symbol of the quantity of symbols, and means for transmitting sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

A non-transitory computer-readable medium storing code for wireless communications at a UE is described. The code may include instructions executable by at least one processor to receive control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols, map a first subset of SRS ports of the set of multiple SRS ports to a first symbol of the quantity of symbols and a second subset of SRS ports of the set of multiple SRS ports to a second symbol of the quantity of symbols, and transmit sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

Some examples of the method, apparatuses, and non-transitory computer-readable medium described herein may further include operations, features, means, or instructions for receiving control signaling including an indication of a threshold quantity of cyclic shifts for the quantity of symbols, mapping each SRS port of the first subset of SRS ports to a respective cyclic shift based on the threshold quantity of cyclic shifts and a respective SRS port index, and mapping each SRS port of the second subset of SRS ports to a respective cyclic shift based on the threshold quantity of cyclic shifts and a respective SRS port index.

In some examples of the method, apparatuses, and non-transitory computer-readable medium described herein, transmitting the sounding reference signaling may include operations, features, means, or instructions for sounding each SRS port of the first subset of SRS ports and each SRS port of the second subset of SRS ports according to the respective cyclic shifts.

Some examples of the method, apparatuses, and non-transitory computer-readable medium described herein may further include operations, features, means, or instructions for dividing the set of multiple SRS ports into the first subset of SRS ports and the second subset of SRS ports, the first subset of SRS ports being associated with a first set of port indices, and the second subset of SRS ports being associated with a second set of port indices and setting the second set of port indices equal to the first set of port indices, where mapping each SRS port of the first subset of SRS ports to a respective cyclic shift and mapping each SRS port of the second subset of SRS ports to a respective cyclic shift may be based on setting the second set of port indices equal to the first set of port indices.

In some examples of the method, apparatuses, and non-transitory computer-readable medium described herein, the mapping may include operations, features, means, or instructions for mapping each SRS port of the first subset of SRS ports to the first frequency resource comb and each SRS port of the second subset of SRS ports to the second frequency resource comb.

In some examples of the method, apparatuses, and non-transitory computer-readable medium described herein, a first comb offset, a first comb pattern, or both associated with the first frequency resource comb may be different than a second comb offset, a second comb pattern, or both associated with the second frequency resource comb.

In some examples of the method, apparatuses, and non-transitory computer-readable medium described herein, the mapping may include operations, features, means, or instructions for mapping a third subset of SRS ports of the set of multiple SRS ports to a third symbol of the quantity of symbols and transmitting sounding reference signaling using the third subset of SRS ports via the third symbol according to a third frequency resource comb of the quantity of frequency resource combs.

In some examples of the method, apparatuses, and non-transitory computer-readable medium described herein, the control signaling may be received as a radio resource control message.

A method for wireless communications at a network entity is described. The method may include outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols, obtaining sounding reference signaling associated with a first subset of SRS ports via a first symbol according to a first frequency resource comb of the quantity of frequency resource combs, and obtaining sounding reference signaling associated with a second subset of SRS ports via a second symbol according to a second frequency resource comb of the quantity of frequency resource combs.

An apparatus for wireless communications at a network entity is described. The apparatus may include at least one processor, memory coupled with the at least one processor, and instructions stored in the memory. The instructions may be executable by the at least one processor to cause the apparatus to output control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols, obtain sounding reference signaling associated with a first subset of SRS ports via a first symbol according to a first frequency resource comb of the quantity of frequency resource combs, and obtain sounding reference signaling associated with a second subset of SRS ports via a second symbol according to a second frequency resource comb of the quantity of frequency resource combs.

Another apparatus for wireless communications at a network entity is described. The apparatus may include means for outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols, means for obtaining sounding reference signaling associated with a first subset of SRS ports via a first symbol according to a first frequency resource comb of the quantity of frequency resource combs, and means for obtaining sounding reference signaling associated with a second subset of SRS ports via a second symbol according to a second frequency resource comb of the quantity of frequency resource combs.

A non-transitory computer-readable medium storing code for wireless communications at a network entity is described. The code may include instructions executable by at least one processor to output control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols, obtain sounding reference signaling associated with a first subset of SRS ports via a first symbol according to a first frequency resource comb of the quantity of frequency resource combs, and obtain sounding reference signaling associated with a second subset of SRS ports via a second symbol according to a second frequency resource comb of the quantity of frequency resource combs.

Some examples of the method, apparatuses, and non-transitory computer-readable medium described herein may further include operations, features, means, or instructions for outputting control signaling including an indication of a threshold quantity of cyclic shifts for the quantity of symbols.

In some examples of the method, apparatuses, and non-transitory computer-readable medium described herein, obtaining the sounding reference signaling may include operations, features, means, or instructions for obtaining the sounding reference signaling from the set of multiple SRS ports, each SRS port mapped to a respective cyclic shift based on the threshold quantity of cyclic shifts.

Some examples of the method, apparatuses, and non-transitory computer-readable medium described herein may further include operations, features, means, or instructions for mapping each SRS port of the first subset of SRS ports to the first frequency resource comb and each SRS port of the second subset of SRS ports to the second frequency resource comb, where obtaining the sounding reference signaling may be based on the mapping.

Some examples of the method, apparatuses, and non-transitory computer-readable medium described herein may further include operations, features, means, or instructions for performing channel measurements based on obtaining the sounding reference signaling associated with the first subset of SRS ports and the second subset of SRS ports.

In some examples of the method, apparatuses, and non-transitory computer-readable medium described herein, a first comb offset, a first comb pattern, or both associated with the first frequency resource comb may be different than a second comb offset, a second comb pattern, or both associated with the second frequency resource comb.

In some examples of the method, apparatuses, and non-transitory computer-readable medium described herein, the control signaling may be output as a radio resource control message.

DETAILED DESCRIPTION

Figure 1:
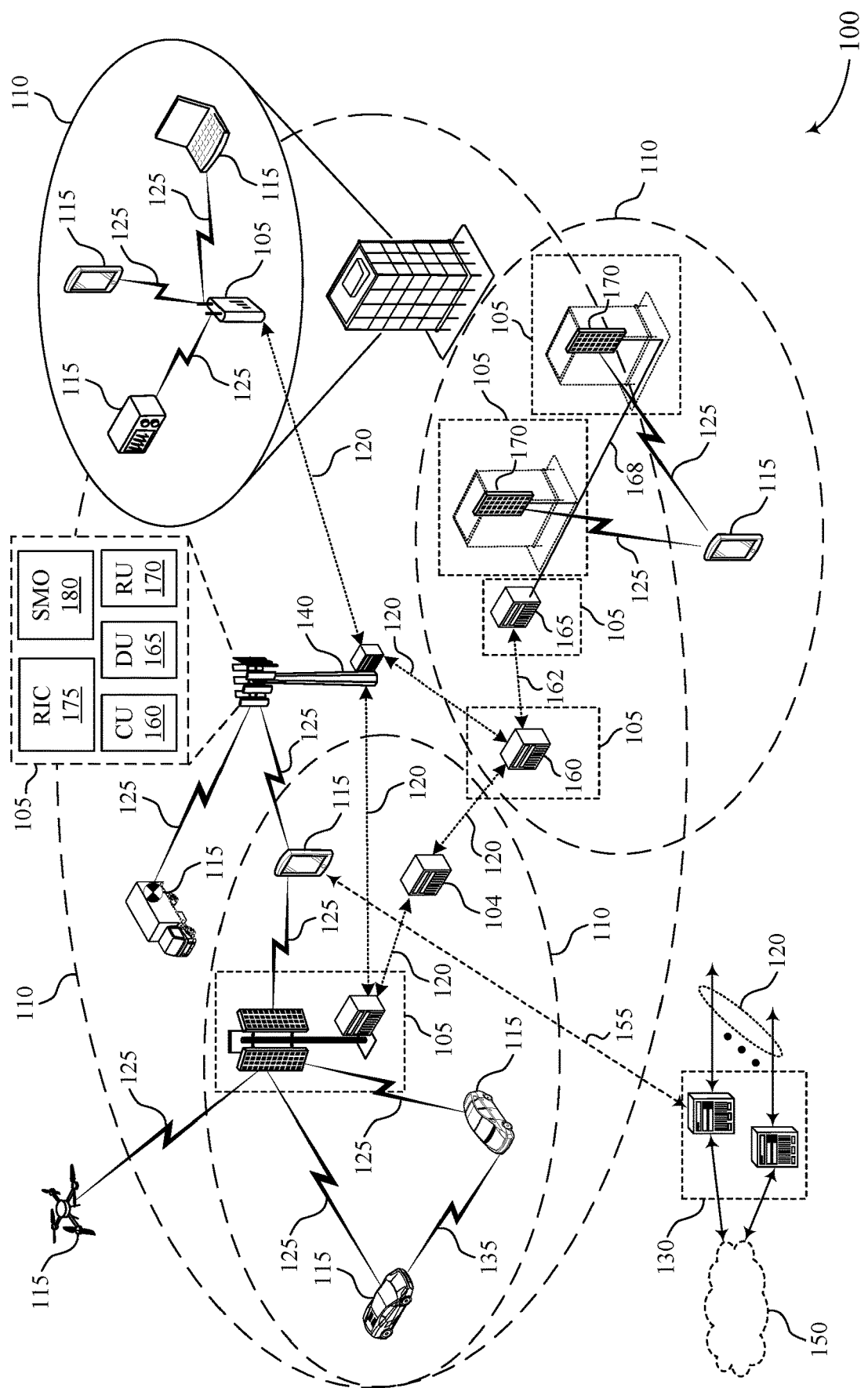
FIG. 1 and FIG. 2 illustrate examples of a wireless communications system that supports sounding reference signal (SRS) port enhancements for uplink transmissions in accordance with one or more aspects of the present disclosure.

In some wireless communications systems, a user equipment (UE) may communicate with a network entity via one or more transmission layers (e.g., one, two, or four transmission layers) on a physical uplink shared channel (PUSCH). In such systems, to support up to four transmission layers, the UE may sound up to four sounding reference signal (SRS) ports, such that the network entity may estimate uplink channel quality. For example, the UE may transmit, up to four SRS sequences via a corresponding quantity of SRS ports to the network entity. The network entity may estimate uplink channel quality for communications with the UE based on the received SRS sequences. The UE may map each SRS port to a comb (e.g., a pattern of frequency resources) for an orthogonal frequency division multiplexing (OFDM) symbol, and may transmit the SRSs according to a cyclic shift (e.g., which may depend on a port index for the SRS port, a quantity of SRS ports, and a threshold quantity of cyclic shifts).

In some scenarios (e.g., in 5G new radio (NR) wireless communications systems), a UE may support an increased quantity of transmission layers (e.g., eight transmission layers). An increased quantity of transmission layers may result in increased throughput, improved reliability of signaling, more efficient use of system resources, and improved user experience. To support an increased quantity of transmission layers (e.g., eight transmission layers on a PUSCH), the UE may also support an increased quantity of SRS ports (e.g., eight SRS ports). However, techniques for mapping SRS ports to combs and OFDM symbols that are based on a first quantity of supported transmission layers (e.g., four transmission layers) may not effectively support a higher quantity of transmission layers (e.g., eight transmission layers). If applying such techniques, the UE may experience failed or incomplete SRS procedures, increased latency, inefficient use of resources, and decreased user experience, among other disadvantages.

The techniques described herein may enable a UE to map SRS ports (e.g., eight SRS ports) to more than one symbol, thereby enabling the UE to sound SRS ports in support of wireless communications using a high quantity of transmission layers (e.g., eight layers). In some implementations, the network entity may configure the UE with SRS port mapping information. For example, the UE may receive configuration information (e.g., RRC signaling) indicating one or more parameter values for SRS port mapping across multiple symbols. The parameter values may include a quantity of symbols and a specific comb, comb size, and comb index corresponding to each indicated symbol. The UE may use the configuration information and corresponding parameter values to map the SRS ports (e.g., eight SRS ports) to combs across multiple OFDM symbols.

In some examples, the UE may use the configuration information to split the total quantity of SRS ports into subsets of SRS ports associated with each symbol. The subsets of SRS ports may be referred to as local SRS ports (e.g., eight SRS ports into two groups of four local SRS ports in two respective symbols, or the like). The UE may calculate the cyclic shift of each mapped SRS port in each symbol based on the location SRS ports in each symbol, according to the received configuration information. In this way, the UE may map SRS ports to multiple OFDM symbols, thereby enabling the UE to support wireless communications using a high quantity of transmission layers (e.g., eight layers).

Aspects of the disclosure are initially described in the context of wireless communications systems. Aspects of the present disclosure support SRS port enhancements for uplink transmissions. Aspects of the disclosure are further illustrated by and described with reference to apparatus diagrams, system diagrams, and flowcharts that relate to SRS port enhancements for uplink transmissions.

FIG. 1 illustrates an example of a wireless communications system 100 that supports SRS port enhancements for uplink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SRS port enhancements for uplink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device) a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of the wireless communications system 100, the UE 115 may support an increased quantity of transmission layers as part of MIMO evolution. For example, the UE 115 (e.g., a vehicle, a customer premises equipment (CPE), an industrial device, a fixed wireless access (FWA) devices, among other examples) may support a quantity of transmission layers (e.g., eight transmission layers) to increase throughput, improve reliability of signaling, and improve user experience for communications with the network entity 105. In such examples, to enable the quantity of transmission layers, enhancements to uplink demodulation reference signals (DMRS), SRSs, SRS resource indicators (SRIs), and transmission precoding matrix indicators (TPMIs) may be implemented. Additionally, coherence assumption, full power modes, and non-full power modes of the UE may affect an multi-layer transmission (e.g., may support up to eight transmission layers).

To support the quantity of transmission layers (e.g., eight transmission layers on a PUSCH), the UE 115 may also support a quantity of SRS ports (e.g., eight SRS ports). However, techniques for mapping SRS ports to combs and OFDM symbols that are based on a first quantity of supported transmission layers (e.g., four transmission layers) may not effectively support a higher quantity of transmission layers (e.g., eight transmission layers). If applying such techniques, the UE 115 may experience failed or incomplete SRS procedures, increased latency, inefficient use of resources, and decreased user experience, among other disadvantages.

The techniques described herein may enable a UE 115 to map SRS ports (e.g., eight SRS ports) to more than one symbol, thereby enabling the UE 115 to sound SRS ports in support of wireless communications using a high quantity of transmission layers (e.g., eight layers). Techniques described herein may also support more flexible resource allocations for SRS sounding (e.g., across multiple symbols, or using various resource combs, among other examples). In some implementations, the network entity 105 may transmit signaling indicating SRS port mapping information. For example, the UE 115 may receive the signaling (e.g., RRC signaling) indicating one or more parameter values for SRS port mapping across multiple symbols. The parameter values may include a quantity of symbols and frequency comb information (e.g., comb size, and a comb index) corresponding to each indicated symbol. The UE 115 may use the information and corresponding parameter values to map the SRS ports (e.g., eight SRS ports) to frequency combs across multiple OFDM symbols.

Figure 2:
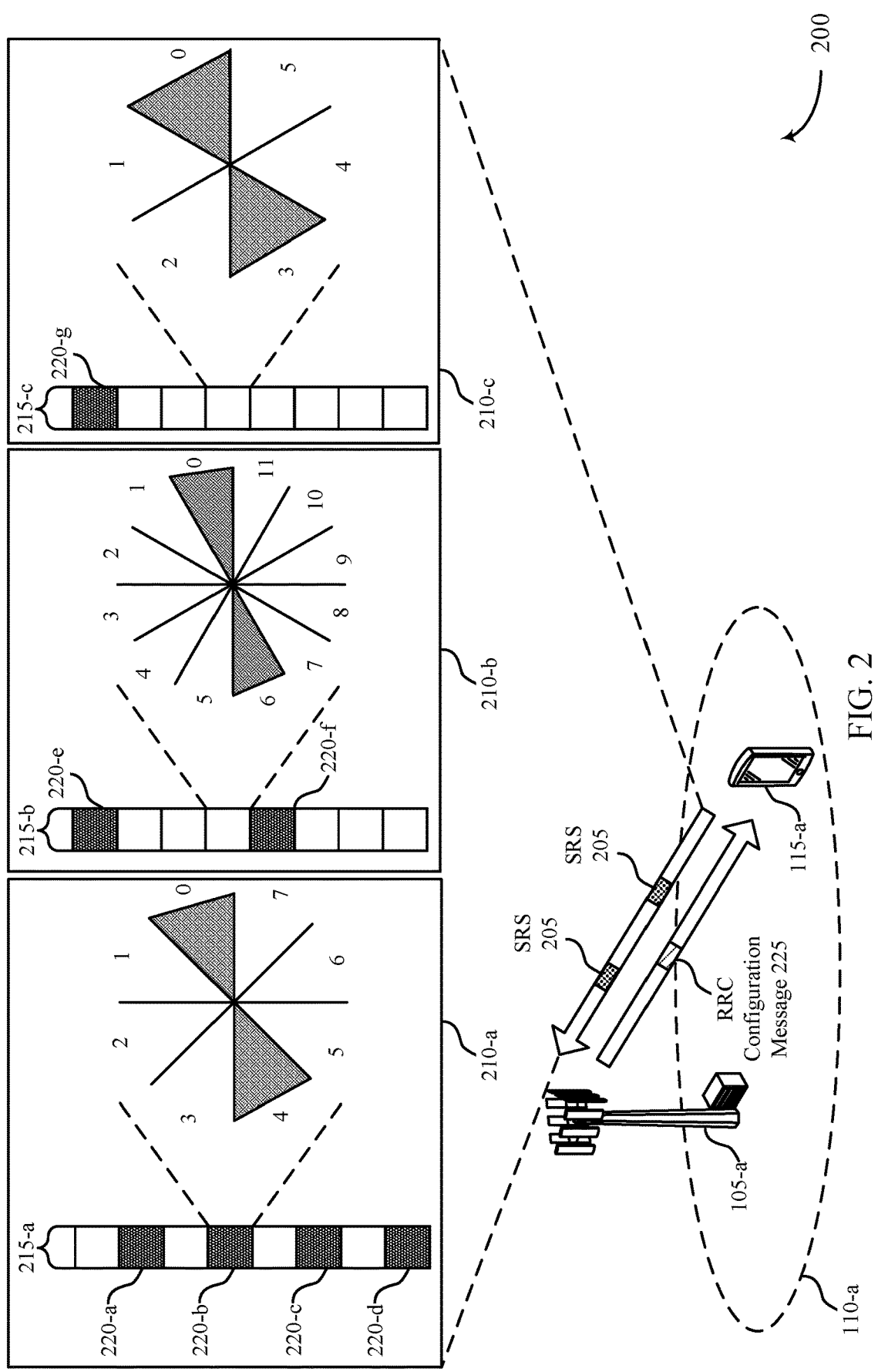

FIG. 2 illustrates an example of a wireless communications system 200 that supports SRS port enhancements for uplink transmissions in accordance with one or more aspects of the present disclosure. The wireless communications system 200 may implement or be implemented by aspects of the wireless communications system 100 with reference to FIG. 1. For example, the wireless communications system 200 may include a network entity 105-a and a UE 115-a which may be examples of corresponding devices described herein with reference to FIG. 1. Likewise, the wireless communications system 200 may include a coverage area 110-a which may be an example of a coverage area 110 described with reference to FIG. 1.

In some cases, the UE 115-a and the network entity 105-a may communicate via one or more transmission layers (e.g., one, two, or four transmission layers) on a PUSCH. In such examples, to support up to four transmission layers, the UE 115-a may sound up to four SRS ports during a single symbol, such that the network entity 105-a may estimate a channel quality for the PUSCH. To sound up to four SRS ports, the UE 115-a may map one, two, or four SRS ports to a comb (e.g., a pattern of frequency resources) on one OFDM symbol 215 and sound the mapped SRS ports according to a cyclic shift. For example, to sound two SRS ports, the UE 115-a may map the two SRS ports to a comb on one OFDM symbol 215 and sound the SRS ports according to two different cyclic shifts. To sound four SRS ports, the UE 115-a may map the four SRS ports to one comb on one OFDM symbol 215 and sound the SRS ports according to four different cyclic shifts. Additionally, or alternatively, to sound four SRS ports, the UE 115-a may map the four SRS ports to two combs on one OFDM symbol 215 and sound the SRS ports according to two different cyclic shifts (e.g., one for each comb).

In some examples, the UE 115-a may map an SRS port associated with one or more SRSs 205 to one comb on one OFDM symbol. For example, each SRS port may be mapped to a comb via signaling from the network entity 105-a (e.g., RRC signaling) on a single OFDM symbol. The UE 115-a may sound the SRS ports via the comb (e.g., may transmit an SRS sequence) and via the OFDM symbol, according to a mapped cyclic shift.

A cyclic shift for each SRS port may depend on a port index, a quantity of SRS ports at the UE 115-a, and a threshold (e.g., maximum) quantity of cyclic shifts. For example, the UE 115-a may map the SRS ports to different cyclic shifts $n_{SRS}^{CS,i}$ based on a UE specific offset $n_{SRS}^{CS}$ (e.g., an offset used by the UE to calculate cyclic shifts for SRS ports), a port index $p_i$, a quantity of SRS ports $N_{ap}^{SRS}$, and a threshold (e.g., maximum) quantity of cyclic shifts $n_{SRS}^{CS,max}$ according to Equation 1:

$$n_{SRS}^{CS,i} = \begin{cases} \left(n_{SRS}^{CS} + \frac{n_{SRS}^{CS,max} \lfloor p_i - 1000/2 \rfloor}{\left(N_{ap}^{SRS}/2\right)}\right) \bmod n_{SRS}^{CS,max} & \text{if } n_{ap}^{SRS} = 4 \text{ and } n_{SRS}^{CS,max} = 6 \\ \left(n_{SRS}^{CS} + \frac{n_{SRS}^{CS,max} \lfloor p_i - 1000 \rfloor}{N_{ap}^{SRS}}\right) \bmod n_{SRS}^{CS,max} & \text{Otherwise} \end{cases} \quad (1)$$

In some cases, the UE 115-a may map the SRS ports to combs on an OFDM symbol according to one or more mapping schemes 210. In the case of mapping scheme 210-a, the UE 115-a may map a first SRS port and a second SRS port to a first comb (e.g., comb two) on an OFDM symbol 215-a. The UE 115-a may map the SRS ports to one or more cyclic shifts of a threshold quantity of cyclic shifts (e.g., eight cyclic shifts, which may be configured by the network entity 105-a). To determine the cyclic shifts of the first SRS port and the second SRS port, the UE 115-a may apply Equation 1.

In some examples, the UE 115-a may have a UE specific offset of zero (e.g., $n_{SRS}^{CS}=0$), a quantity of SRS ports supported by the UE 115-a equal to two (e.g., $N_{ap}^{SRS}=2$), where the first SRS port has an index of 1000 (e.g., $p_0=1000$) and the second SRS port has an index of 1001 (e.g., $p_1=1001$), and a threshold quantity of cyclic shifts equal to eight (e.g., $n_{SRS}^{CS,max}=8$). The UE 115-a may map the first SRS port to a cyclic shift according to Equation 1, and the first SRS port may be mapped to cyclic shift zero. Likewise, for the UE 115-a may map the second SRS port to a cyclic shift according to Equation 1, and the second SRS port may be mapped to cyclic shift four. The UE 115-a may sound the first SRS port (e.g., may transmit an SRS sequence) according to the first comb and applying the cyclic shift of 0, while the UE 115-*a* may sound the second SRS port according to the first comb and applying the cyclic shift of 4. For example, the UE 115-*a* may sound the SRSs 205 via the first SRS port and the second SRS port (e.g., SRS ports 1000 and 1001) across multiple tones 220 (e.g., every other tone 220, including tone 220-*a*, tone 220-*b*, tone 220-*c* and tone 220-*d*) according to the calculated cyclic shifts of zero and four respectively.

In the case of mapping scheme 210-*b*, the UE 115-*a* may map the first SRS port and the second SRS port to a second comb (e.g., comb four) on an OFDM symbol 215-*b*. The UE 115-*a* may map the first SRS port and the second SRS port to one or more cyclic shifts of a threshold quantity of cyclic shifts (e.g., twelve cyclic shifts, which may be configured by the network entity 105-*a*) based on applying Equation 1. In such examples, the UE 115-*a* may map the first SRS port to cyclic shift zero and the second SRS port to cyclic shift six. The UE 115-*a* may transmit the SRSs 205 via the first SRS port and the second SRS port according to the second comb (e.g., comb four) and applying the respective cyclic shifts. For example, the UE 115-*a* may sound the SRS ports (e.g., SRS ports 1000 and 1001) across multiple tones 220 (e.g., every fourth tone 220, including tone 220-*e* and tone 220-*f*) according to the calculated cyclic shifts of zero and six respectively.

In some examples, as illustrated with reference to mapping scheme 210-*c*, the UE 115-*a* may map the first SRS port and the second SRS port to a third comb (e.g., comb eight) on an OFDM symbol 215-*c*. The UE 115-*a* may map the first SRS port and the second SRS port to one or more cyclic shifts of a threshold quantity of cyclic shifts (e.g., six cyclic shifts, which may be configured by the network entity 105-*a*) based on applying Equation 1. In such examples, the UE 115-*a* may map the first SRS port to cyclic shift zero and the second SRS port to cyclic shift three. The UE 115-*a* may transmit the SRSs 205 via the first SRS port and the second SRS port according to the third comb (e.g., comb eight) and applying the respective cyclic shifts. For example, the UE 115-*a* may sound the SRS ports (e.g., SRS ports 1000 and 1001) across multiple tones 220 (e.g., every eighth tone 220, including tone 220-*g*) according to the calculated cyclic shifts of zero and three respectively.

In some cases of wireless communications system 200, the UE 115-*a* may support a quantity of transmission layers (e.g., eight transmission layers) which may result in increased throughput, improved reliability in wireless signaling, and improved user experience, among other examples. In such implementations, the UE 115-*a* may sound SRS ports (e.g., eight SRS ports). In some examples, the network entity 105-*a* and the UE 115-*a* may support (e.g., the network entity 105-*a* may configure) an SRS resource that can support SRS signaling via the SRS ports (e.g., eight SRS ports). In such examples, the SRS ports may be indexed sequentially (e.g., the eight SRS ports are indexed as 1000+i where i=0, 1, 2, . . . , 7). In some examples, the network entity 105-*a* may configure multiple SRS resources in an SRS resource set, where each SRS resource supports less than a total quantity of SRS ports (e.g., eight SRS ports). In some examples, the network entity 105-*a* may configure multiple SRS resources, where at least one SRS resource supports up to eight SRS ports indexed sequentially, and where one or more additional SRS resource support a subset of the total quantity of SRS ports (e.g., two SRS ports, or four SRS ports, among other examples).

In such cases, however, techniques for mapping SRS ports to combs and orthogonal OFDM symbols 215 that are based on a first quantity of supported transmission layers (e.g., four transmission layers) may not effectively support a higher quantity of transmission layers (e.g., eight transmission layers). If applying such techniques, the UE 115-*a* may experience failed or incomplete SRS procedures, increased latency, inefficient use of resources, and decreased user experience, among other disadvantages.

According to aspects of the present disclosure, to support a quantity of SRS ports (e.g., eight SRS ports), thereby enabling the UE to transmit via a quantity of transmission layers, the UE 115-*a* may map the SRS ports to more than one OFDM symbol 215. For example, the UE 115-*a* may receive an RRC configuration message 225 (e.g., control signaling) associated with multiple (e.g., eight) SRS ports. The RRC configuration message 225 may indicate one or more parameters for SRS port mapping. For example, the parameters may include a quantity of OFDM symbols 215 via which the UE 115-*a* may use to transmit SRSs 205, a frequency comb for each respective OFDM symbol 215, the size of each comb, a comb index associated with the indicated combs, a threshold quantity of cyclic shifts associated with the quantity of OFDM symbols 215, or a combination thereof.

In some examples, the UE 115-*a* may use the indicated parameters to divide the multiple SRS ports into sets of local SRS ports associated with the multiple OFDM symbols 215 (e.g., two sets of four local SRS ports associated with two OFDM symbols respectively). The UE 115-*a* may map the sets of local SRS ports to the associated OFDM symbols 215, combs, and cyclic shifts according to the indicated parameters. For example, the UE 115-*a* may map the sets of local SRS ports to the associated OFDM symbols 215, combs, and cyclic shifts according to the techniques described herein with reference to FIGS. 3 and 4. The UE 115-*a* may sound the sets of local SRS ports associated with the SRSs 205 (e.g., transmit the SRSs 205 using the SRS ports) based on the mapping. For example, the UE 115-*a* may transmit SRS signaling using the sets of local SRS ports via the mapped OFDM symbols 215 according to the respective combs and cyclic shifts. As used herein, transmitting or outputting SRS signaling, performing sounding reference signaling, transmitting SRS sequences, among other examples, may refer to transmitting SRSs 205, sounding SRS ports, or both.

Figure 3:
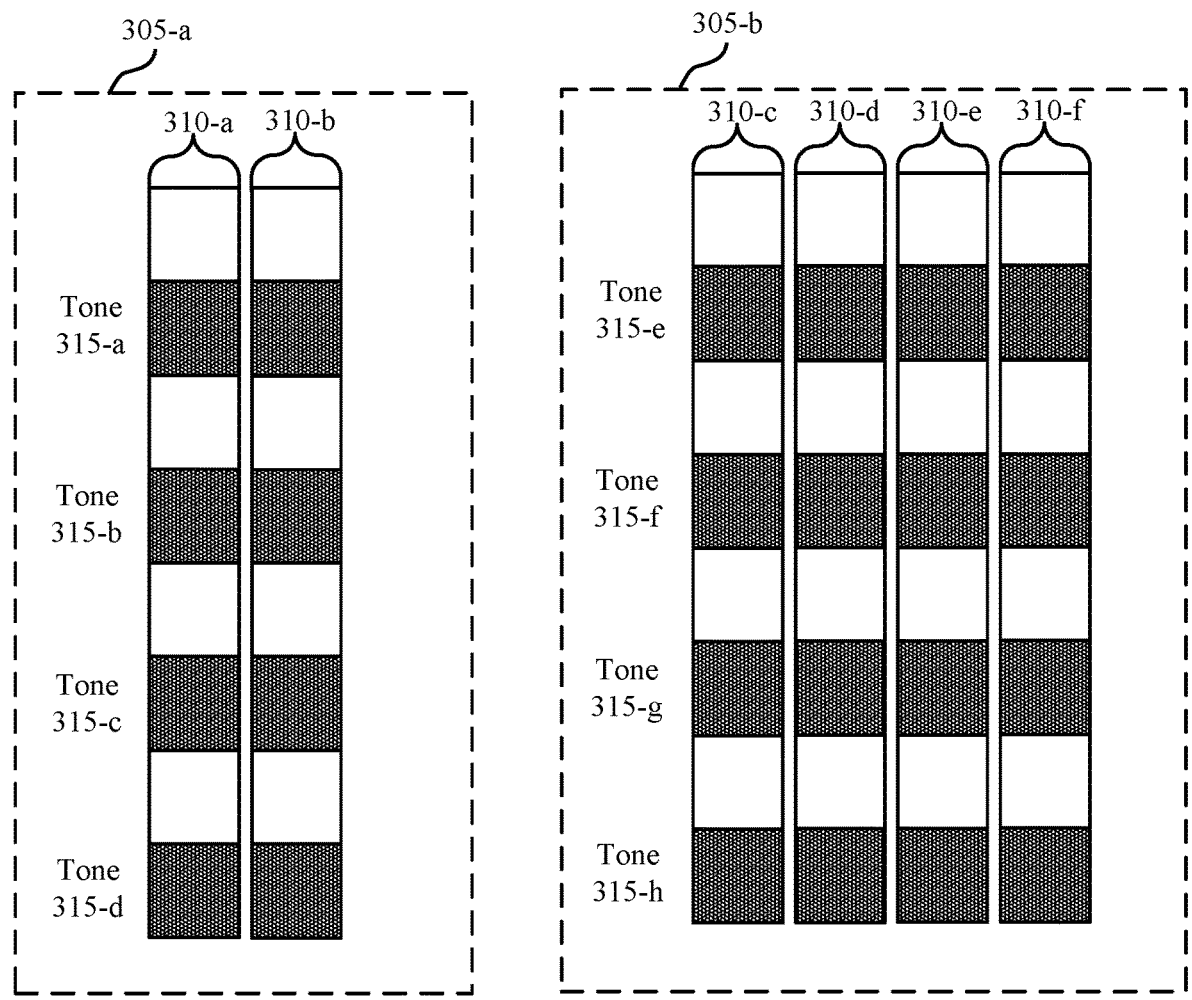
FIG. 3 and FIG. 4 illustrate examples of a SRS port mapping scheme that supports SRS port enhancements for uplink transmissions in accordance with one or more aspects of the present disclosure.

FIG. 3 illustrates an example of a SRS port mapping scheme 300 that supports SRS port enhancements for uplink transmissions in accordance with one or more aspects of the present disclosure. The SRS port mapping scheme 300 may implement or be implemented by aspects of the wireless communications system 100 and the wireless communications system 200 with reference to FIGS. 1 and 2. For example, the SRS port mapping scheme 300 may be implemented by a UE 115 as described herein with reference to FIGS. 1 and 2. Additionally, the SRS port mapping scheme 300 may include OFDM symbols 310 and tones 315, which may be examples of OFDM symbols 215 and tones 220 described herein with reference to FIG. 2.

In some implementations of the SRS port mapping scheme 300, a UE 115 may receive control signaling (e.g., RRC configuration message 225) indicating one or more parameters associated with mapping SRS ports (e.g., eight SRS ports) to multiple OFDM symbols 310 (e.g., one, two, or four). In such implementations, a network entity 105 may transmit a configuration message indicating a quantity of OFDM symbols 310, a frequency comb for each respective OFDM symbol 310, the size of each comb, a comb index associated with the indicated frequency combs, a threshold quantity of cyclic shifts associated with the quantity of OFDM symbols 310, or a combination thereof.

For example, the UE 115 may receive the control signaling indicating a quantity of symbols, and may map the SRS ports (e.g., eight SRS ports indexed from 1000 . . . 1007) to one, two, or four OFDM symbols 310. In such examples, the UE 115 may map subsets of a total quantity of supported SRS ports to the symbols. In some examples, a subset of SRS ports mapped to each symbol may be referred to as local SRS ports. For example, a quantity of local SRS ports (e.g., $n_{ap}^{SRS}$) may be a subset of a total quantity of SRS ports (e.g., $N_{ap}^{SRS}$) supported by the UE 115. For example, for the indicated quantity of OFDM symbols, L, a quantity of local ports may be defined according to the Equation 2 below:

$$n_{ap}^{SRS} = \frac{N_{ap}^{SRS}}{L} \text{ where } L = 1, 2, \text{ or } 4 \quad (2)$$

In some examples, if the total quantity of SRS ports is eight (e.g., $N_{ap}^{SRS}=8$) and the indicated quantity of OFDM symbols is two (e.g., L=2) then the quantity of local SRS per OFDM symbol may be four.

In a mapping scheme 305-a, the UE 115 may map the local SRS ports to multiple (e.g., two) OFDM symbols 410. In such cases, the UE 115 may divide the SRS ports into a first set of local SRS ports and a second set of local SRS ports. For example, the UE 115 may divide the total quantity of supported SRS ports into a first set of local SRS ports (e.g., SRS port 1000, SRS port 1001, SRS port 1002, and SRS port 1003) and a second set of local SRS ports (e.g., SRS port 1004, SRS port 1005, SRS port 1006, and SRS port 1007). The UE 115 may map the first set of local SRS ports (e.g., SRS port 1000, SRS port 1001, SRS port 1002, and SRS port 1003) to OFDM symbol 310-a. Likewise, the UE 115 may map the second set of local SRS ports (e.g., SRS port 1004, SRS port 1005, SRS port 1006, and SRS port 1007) to OFDM symbol 310-b. In some scenarios, the OFDM symbol 310-a and the OFDM symbol 310-b may be back-to-back or adjacent to one another, or may be non-consecutive in time (e.g., there may be one or more symbols between the symbol 310-a and the symbol 310-b).

Based on the SRS port to OFDM symbol 310 mapping, the UE 115 may sound the SRS ports (e.g., first and second sets of local SRS ports) according to one or more combs associated with the OFDM symbol 310-a and the OFDM symbol 310-b. For example, the UE 115 may sound the first set of local SRS ports during OFDM symbol 310-a according to a first comb (e.g., comb 2), and may similarly sound the second set of local SRS ports during OFDM symbol 310-b according to a second comb (e.g., comb 2). In such examples, the UE 115 may sound the SRS ports across multiple tones 315 (e.g., every other tone 315, including tone 315-a, tone 315-b, tone 315-c, and tone 315-d, or including tone 315-e, tone 315-f, tone 315-g, and tone 315-h) according to an indicated comb 2. That is, the UE 115 may sound the first set of local SRS ports of the total quantity of supported SRS ports during OFDM symbol 310-a, and may sound the second set of local SRS ports of the total quantity of supported SRS ports during OFDM symbol 310-b. The combs may be the same, or different, for each symbol 310, as described in greater detail with reference to FIG. 4, and the UE 115 may map different ports to different cyclic shifts, as described in greater detail with reference to FIG. 4 and FIG. 5.

In some examples, if the control signaling indicates to map the SRS ports to four OFDM symbols, the UE 115 may use a mapping scheme 305-b. In such cases, the UE 115 may divide the SRS ports into a first set of two local SRS ports (e.g., SRS port 1000 and SRS port 1001), a second set of two local SRS ports (e.g., SRS port 1002 and SRS port 1003), a third set of two local SRS ports (e.g., SRS port 1004 and SRS port 1005), and a fourth set of two local SRS ports (e.g., SRS port 1006 and SRS port 1007). The UE 115 may map the first set of local SRS ports to OFDM symbol 310-c, the second set of local SRS ports to OFDM symbol 310-d, the third set of local SRS ports to OFDM symbol 310-e, and the fourth set of local SRS ports to the OFDM symbol 310-f. Similar to the mapping scheme 305-a, the UE 115 may sound the mapped first set of local SRS ports during OFDM symbol 310-c, the second set of local SRS ports during OFDM symbol 310-d, the third set of local SRS ports during OFDM symbol 310-e, and the fourth set of local OFDM symbol 310-f according to one or more combs.

In some cases, the UE 115 may receive control signaling indicating to map the SRS ports to multiple (e.g., three) OFDM symbols 310. In such cases, the UE 115 may divide the divide the SRS ports into a first set of four local SRS ports (e.g., SRS port 1000, SRS port 1001, SRS port 1002, and SRS port 1003), a second set of two local SRS ports (e.g., SRS port 1004 and SRS port 1005), and a third set of two local SRS ports (e.g., SRS port 1006 and SRS port 1007). Thus, the UE 115 may map the first set of local SRS ports to a first OFDM symbol 310, the second set of local SRS ports to a second OFDM symbol 310, and the third set of local SRS ports to a third OFDM symbol 310.

The techniques described herein may enable a UE 115 to map an increased quantity of SRS ports (e.g., eight SRS ports) to multiple OFDM symbols 310, thereby enabling the UE 115 to support an increased quantity of transmission layers (e.g., eight transmission layers). Thus, the UE 115 may increase signal reliability, increase throughput, and improve user experience.

Figure 4:
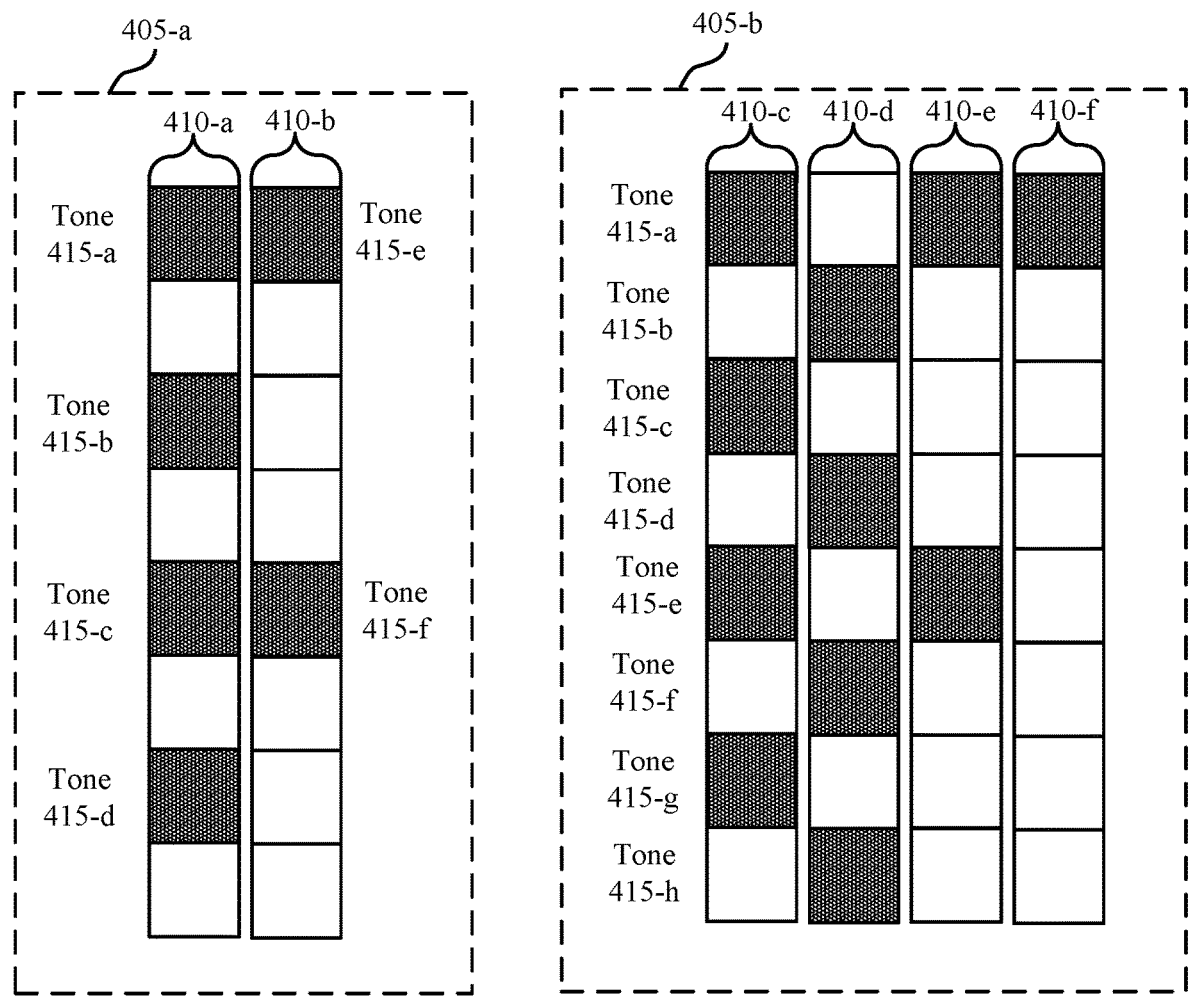

FIG. 4 illustrates an example of a SRS port mapping scheme 400 that supports SRS port enhancements for uplink transmissions in accordance with one or more aspects of the present disclosure. The SRS port mapping scheme 400 may implement or be implemented by aspects of the wireless communications system 100, the wireless communications system 200, and the SRS port mapping scheme 300 with reference to FIGS. 1 through 3. For example, the SRS port mapping scheme 400 may be implemented by a UE 115 as described herein with reference to FIGS. 1 and 2. Additionally, the SRS port mapping scheme 400 may include OFDM symbols 410 and tones 415, which may be examples of OFDM symbols and tones described herein with respect to FIGS. 2 and 3.

In some implementations of the SRS port mapping scheme 400, the UE 115 may map the local SRS ports (e.g., mapped to various symbols as described in greater detail with reference to FIG. 3) to one or more combs within the one or more OFDM symbols 410. That is, the network may use RRC signaling to map local ports (e.g., subsets of total SRS ports supported by the UE 115 in each symbol) to one comb or multiple combs (e.g., the combs for each symbols may be the same, or may be different). The mapped combs may be different or the same on different symbols 410. The UE 115 may map local SRS ports to different combs on different OFDM symbols 410 based on network configured control signaling (e.g., RRC message).

In the example of mapping scheme 405-a, the UE may map a first set of local SRS ports (e.g., SRS port 1000, SRS port 1001, SRS port 1002, and SRS port 1003) to a first comb (e.g., comb two) on OFDM symbol 410-a. Additionally, the UE may map a second set of local SRS ports (e.g., SRS port 1004, SRS port 1005, SRS port 1006, and SRS port 1007) to a second comb (e.g., comb four) on OFDM symbol 410-b. Thus, the UE may sound the first set of local SRS ports according to the first comb (e.g., every other tone 415, including tone 415-a, tone 415-b, tone 415-c, and tone 415-d). Likewise, the UE may sound the second set of local SRS ports according to the second comb (e.g., every fourth tone 415, including tone 415-e and 415-f).

In the example of mapping scheme 405-b, the UE may map a first set of local SRS ports (e.g., SRS port 1000 and SRS port 1001) to a first comb (e.g., comb two with an initial index associated with tone 415-a) on OFDM symbol 410-c. Likewise, the UE may map a second set of local SRS ports (e.g., SRS port 1002 and SRS port 1003) to a second comb (e.g., comb two with an initial index associated with tone 415-b, including every other tone 415, including tone 415-b, tone 415-d, tone 415-f, and tone 415-h) on OFDM symbol 410-d, a third set of local SRS ports (e.g., SRS port 1004 and SRS port 1005) to a third comb (e.g., comb four) on OFDM symbol 410-e, and a fourth set of local SRS ports (e.g., SRS port 1006 and SRS port 1007) to a fourth comb (e.g., comb eight) on OFDM symbol 410-f.

As described herein, the UE may map SRS ports to various combs across multiple supported symbols. The combs may be the same in different symbols with the same initial index (e.g., as described with reference to symbol 310-a and symbol 310-b), may be the same in different symbols with different initial indices (e.g., as described with reference to symbol 410-c and symbol 410-d), or may be different in different symbols (e.g., as described with reference to symbol 410-a and symbol 410-b, or symbol 410-e and symbol 410-f), or any combination thereof. Additionally, the OFDM symbols 410 may be back-to-back or adjacent to one another, or may be non-consecutive in time (e.g., there may be one or more symbols between the symbol 410-a and the symbol 410-b or more than one symbols between each symbol 410-c through symbol 410-f).

On each OFDM symbol 410 and on each comb, the local SRS ports may be mapped to different cyclic shifts. For example, the local SRS ports may be assigned a local port index $p'_i$ according to Equation 3 below:

$$p'_i = (p_i - 1000) \bmod n_{ap}^{SRS} \quad (3)$$

Where $p_i$ denotes the port index of the SRS ports and $n_{ap}^{SRS}$ denotes the quantity of local SRS ports calculated in Equation 2 as described herein with reference to FIG. 3. The local SRS ports may be mapped to the respective cyclic shifts $n_{SRS}^{CS,i}$ based on a UE specific offset $n_{SRS}^{CS}$, the local port index $p'_i$, quantity of local SRS ports $n_{ap}^{SRS}$, and a threshold quantity of cyclic shifts $n_{SRS}^{CS,max}$ according to Equation 4 below:

$$n_{SRS}^{CS,i} = \begin{cases} \left( n_{SRS}^{CS} + \dfrac{n_{SRS}^{CS,max} \lfloor p_i - 1000 \rfloor}{N_{ap}^{SRS}} \right) \bmod n_{SRS}^{CS,max} & \text{if } n_{ap}^{SRS} = 4 \text{ and } n_{SRS}^{CS,max} = 6 \text{ or } n_{ap}^{SRS} = 8 \text{ and } n_{SRS}^{CS,max} = 12 \\ \left( n_{SRS}^{CS} + \dfrac{n_{SRS}^{CS,max} \lfloor p_i - 1000 \rfloor}{N_{ap}^{SRS}} \right) \bmod n_{SRS}^{CS,max} & \text{Otherwise} \end{cases} \quad (4)$$

Thus, the UE 115 may map the SRS ports to one or more combs on multiple OFDM symbols 410 and sound the SRS ports according to respective cyclic shifts, thereby enabling the UE 115 to support an increased quantity of transmission layers (e.g., eight transmission layers). Thus, the UE 115 may increase signal reliability, increase throughput, and improve user experience.

Figure 5:
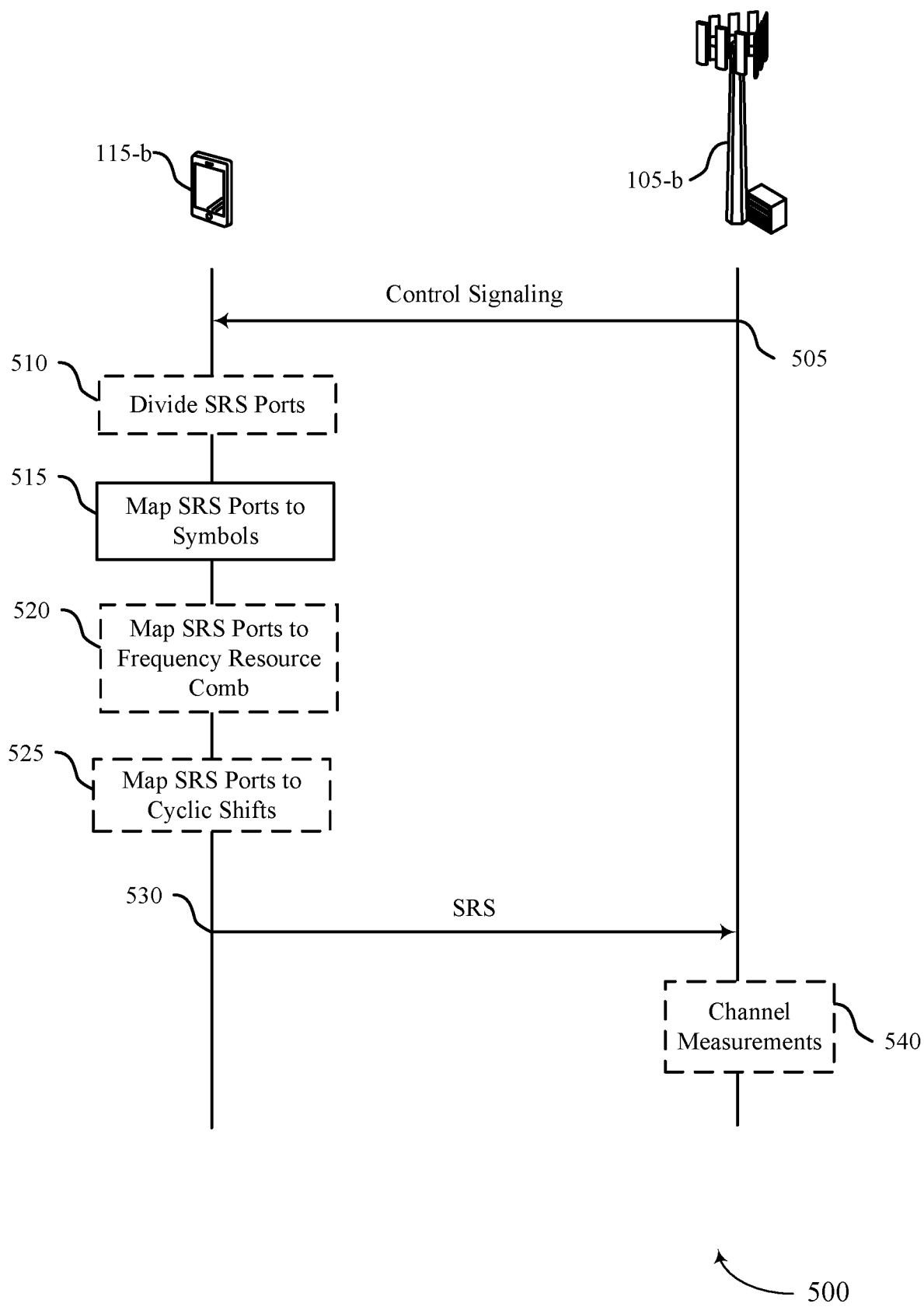
FIG. 5 illustrates an example of a process flow that supports SRS port enhancements for uplink transmissions in accordance with one or more aspects of the present disclosure.

FIG. 5 illustrates an example of a process flow 500 that supports SRS port enhancements for uplink transmissions in accordance with one or more aspects of the present disclosure. The process flow 500 may implement or be implemented by aspects of the wireless communications system 100, the wireless communications system 200, the SRS port mapping scheme 300, and the SRS port mapping scheme 400 with reference to FIGS. 1 through 4. For example, the process flow 500 may implemented by a network entity 105-b and a UE 115-b, which may be examples of corresponding devices described herein with reference to FIGS. 1 through 4.

At 505, the network entity 105-b may transmit, and the UE 115-b receive, control signaling. In some cases, the network entity 105-b may transmit an RRC message that includes information associated with multiple SRS ports (e.g., eight SRS ports). In such cases, the RRC message may indicate a quantity of OFDM symbols via which the UE 115-b is to transmit multiple SRSs, a frequency resource comb, of a quantity of frequency resource combs, for each respective OFDM symbol, a threshold quantity of cyclic shifts for the OFDM symbols, or a combination thereof. The control signaling may be a single control message, or multiple control message carrying respective aspects of the control signaling described herein.

At 510, the UE 115-b may divide the multiple SRS ports into a first subset of SRS ports and a second subset of SRS ports. The first subset of SRS ports and the second subset of SRS ports may be examples of local SRS ports as described herein with reference to FIGS. 3 and 4. In some cases, the first subset of SRS ports may be associated with a first set of port indices, and the second subset of SRS ports may be associated with a second set of port indices. For example, the UE 115-b may use Equation 2 and 3, as described herein with reference to FIGS. 3 and 4, to divide the SRS ports into local SRS ports and assign each local SRS port with a local port index. In such examples, the UE 115-b may set the second set of port indices equal to the first set of port indices.

At 515, the UE 115-b may map the first subset of SRS ports to a first OFDM symbol and the second subset of SRS ports to a second OFDM symbol. In some cases, the UE 115-b may map a third subset of SRS ports to a third OFDM symbol. For example, the UE 115-b may map the local SRS ports to one or more OFDM symbols using the techniques described herein with reference to FIG. 3.

At 520, the UE 115-b may map each SRS port of the first subset of SRS ports to a first frequency comb and each SRS port of the second subset of SRS ports to a second frequency comb. In some cases, a first comb offset (e.g., even or odd comb), a first comb pattern (e.g., comb two, comb four, or comb eight), or both associated with the first frequency comb may be different than a second comb offset, a second comb patter, or both associated with the second frequency resource comb. That is, the UE 115-b may map the local SRS ports to one or more combs on each OFDM symbol, where each comb may be associated with different characteristics such as comb pattern and comb offset.

At 525, the UE 115-b may map each SRS port of the first subset of SRS ports to a respective cyclic shift and map each SRS port of the second subset of SRS ports to a respective cyclic shift based on the threshold quantity of cyclic shifts and the respective SRS port indices. In some cases, the UE 115-*b* may map each SRS port of the first subset of SRS ports and the second subset of SRS ports to the respective cyclic shifts based on setting the second set of port indices equal to the first set of port indices as described herein with reference to step 510.

For example, the UE **115-*b* may use Equation 4, as described herein with reference to FIG. 4, to calculate the respective cyclic shift for each SRS port of the first subset of SRS ports and the second subset of SRS ports. The UE 115-*b*** may map each SRS port of the respective subsets to the respective cyclic shifts based on the calculation.

At 530, the UE **115-*b* may transmit, and the network entity 105-*b* receive, SRS signaling using the first subset of SRS ports mapped to the first frequency comb on the first OFDM symbol and using the second subset of SRS ports mapped to the second frequency comb on the second OFDM symbol. For example, the UE 115-*b* may sound each SRS port of the first subset of SRS ports and the second subset of SRS ports according to the respective cyclic shifts calculated as described with respect to step 525. In cases of mapping a third subset of SRS ports, the UE 115-*b* may transmit SRSs using the third subset mapped to a third frequency comb on the third OFDM symbol according to respective cyclic shift. In some examples, the UE 115-*a* may transmit SRS signaling using the sets of local SRS ports via the mapped OFDM symbols 215 according to the respective combs and cyclic shifts. As used herein, transmitting or outputting SRS signaling, performing sounding reference signaling, transmitting SRS sequences, among other examples, may refer to transmitting SRSs 205**, sounding SRS ports, or both.

At 540, the network entity **105-*b* may perform channel measurements based on obtaining the SRSs associated with the first subset of SRS ports, the second subset of SRS ports, and the third subset of SRS ports. For example, the network entity 105-*b* may receive the SRSs (e.g., eight SRSs) and perform channel measurements for the SRSs to support an increased quantity of transmission layers (e.g., eight transmission layers) between the UE 115-*b* and the network entity 105-*b***.

Thus, the techniques of process flow 500 may be implemented to enable the UE **115-*b* to map an increased quantity of SRS ports to one or more combs on multiple OFDM symbols and sound the SRS ports according to cyclic shifts, thereby enabling the UE 115 to support an increased quantity of transmission layers (e.g., eight transmission layers). Thereby enabling the UE 115-*b*** to have increased signal reliability, increased throughput, and an improved user experience.

Figure 6:
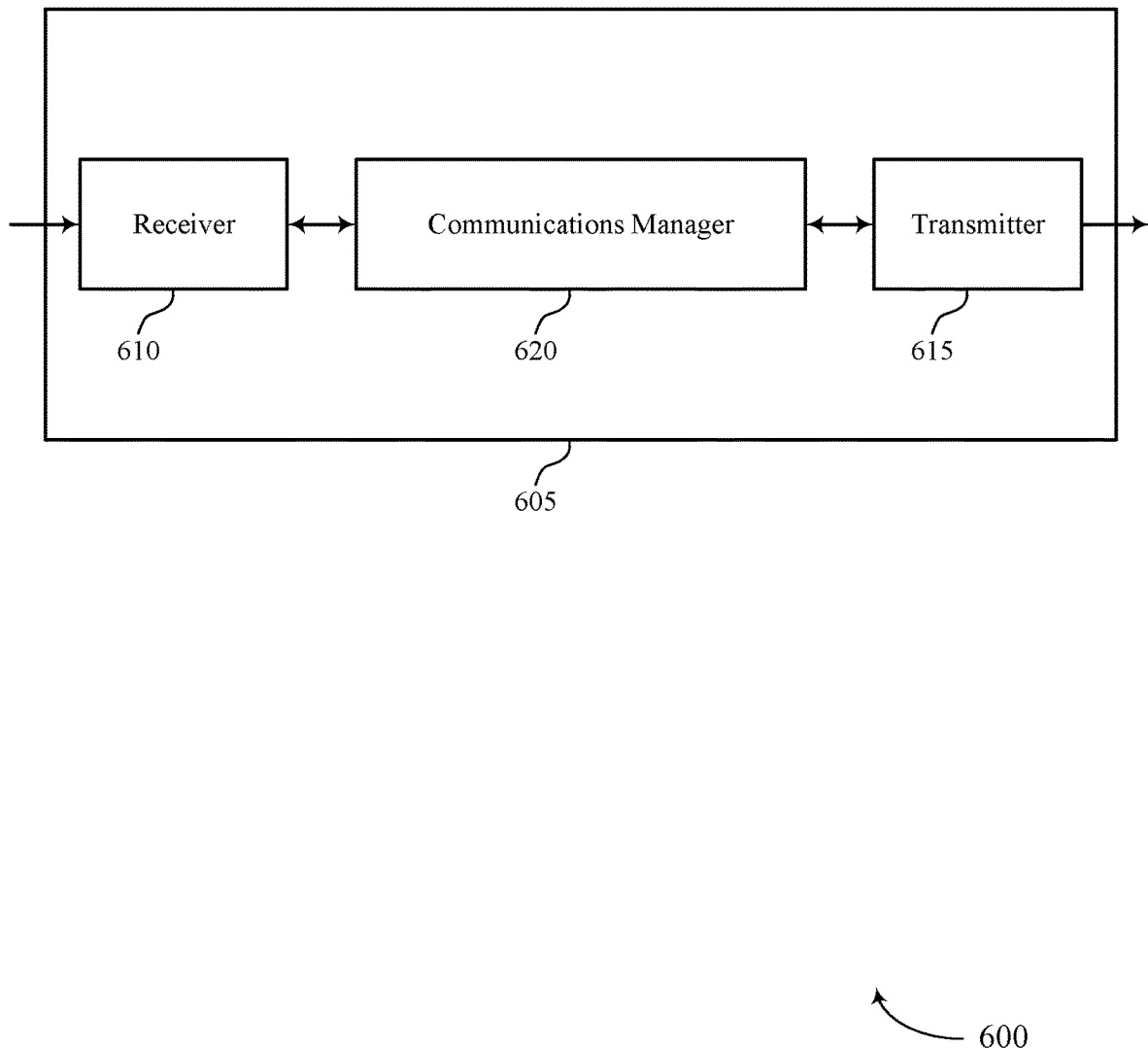
FIGS. 6 and 7 show block diagrams of devices that support SRS port enhancements for uplink transmissions in accordance with one or more aspects of the present disclosure.

FIG. 6 shows a block diagram 600 of a device 605 that supports SRS port enhancements for uplink transmissions in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to SRS port enhancements for uplink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SRS port enhancements for uplink transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of SRS port enhancements for uplink transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a graphics processing unit (GPU), an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The communications manager 620 may be configured as or otherwise support a means for mapping a first subset of SRS ports of the set of multiple SRS ports to a first symbol of the quantity of symbols and a second subset of SRS ports of the set of multiple SRS ports to a second symbol of the quantity of symbols. The communications manager 620 may be configured as or otherwise support a means for transmitting SRSs using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
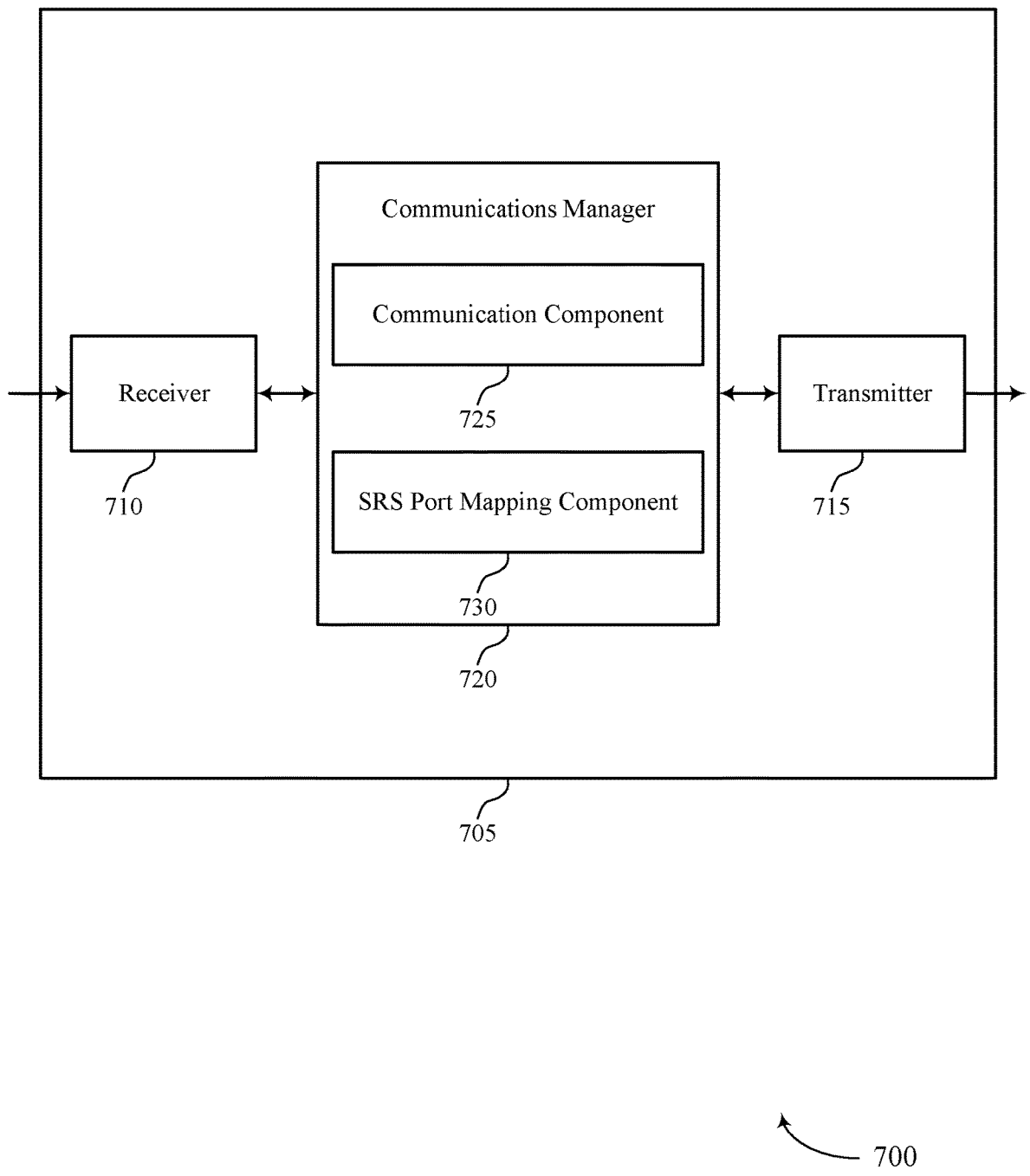

FIG. 7 shows a block diagram 700 of a device 705 that supports SRS port enhancements for uplink transmissions in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to SRS port enhancements for uplink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to SRS port enhancements for uplink transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of SRS port enhancements for uplink transmissions as described herein. For example, the communications manager 720 may include a communication component 725 an SRS port mapping component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The communication component 725 may be configured as or otherwise support a means for receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The SRS port mapping component 730 may be configured as or otherwise support a means for mapping a first subset of SRS ports of the set of multiple SRS ports to a first symbol of the quantity of symbols and a second subset of SRS ports of the set of multiple SRS ports to a second symbol of the quantity of symbols. The communication component 725 may be configured as or otherwise support a means for transmitting SRS using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

Figure 8:
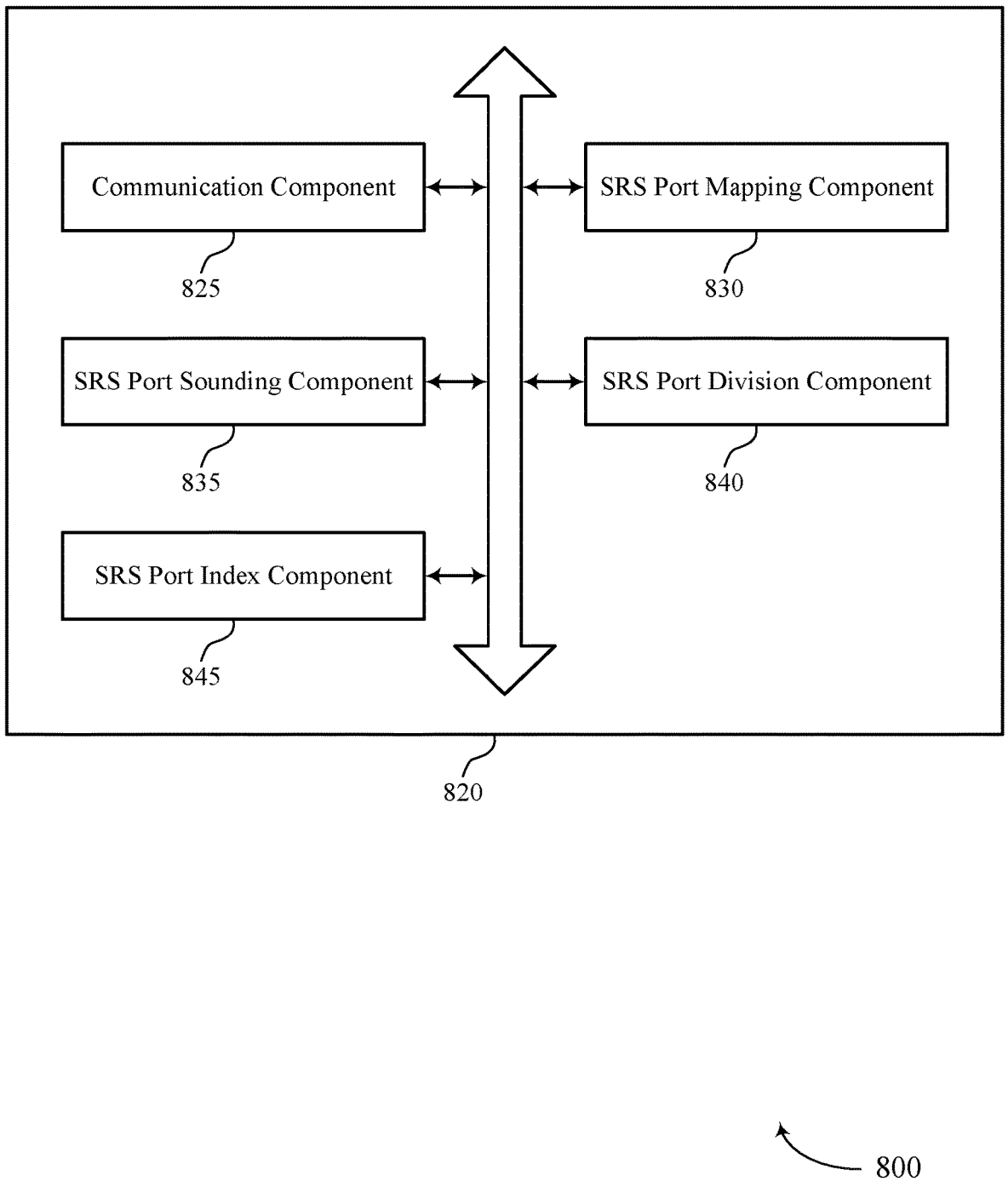
FIG. 8 shows a block diagram of a communications manager that supports SRS port enhancements for uplink transmissions in accordance with one or more aspects of the present disclosure.

FIG. 8 shows a block diagram 800 of a communications manager 820 that supports SRS port enhancements for uplink transmissions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of SRS port enhancements for uplink transmissions as described herein. For example, the communications manager 820 may include a communication component 825, an SRS port mapping component 830, an SRS port sounding component 835, an SRS port division component 840, an SRS port index component 845, or any combination thereof. Each of these components may communicate, directly or indirectly, with one another (e.g., via one or more buses).

The communications manager 820 may support wireless communications at a UE in accordance with examples as disclosed herein. The communication component 825 may be configured as or otherwise support a means for receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The SRS port mapping component 830 may be configured as or otherwise support a means for mapping a first subset of SRS ports of the set of multiple SRS ports to a first symbol of the quantity of symbols and a second subset of SRS ports of the set of multiple SRS ports to a second symbol of the quantity of symbols. In some examples, the communication component 825 may be configured as or otherwise support a means for transmitting SRS using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

In some examples, the communication component 825 may be configured as or otherwise support a means for receiving control signaling including an indication of a threshold quantity of cyclic shifts for the quantity of symbols. In some examples, the SRS port mapping component 830 may be configured as or otherwise support a means for mapping each SRS port of the first subset of SRS ports to a respective cyclic shift based on the threshold quantity of cyclic shifts and a respective SRS port index. In some examples, the SRS port mapping component 830 may be configured as or otherwise support a means for mapping each SRS port of the second subset of SRS ports to a respective cyclic shift based on the threshold quantity of cyclic shifts and a respective SRS port index.

In some examples, to support transmitting the SRS, the SRS port sounding component 835 may be configured as or otherwise support a means for sounding each SRS port of the first subset of SRS ports and each SRS port of the second subset of SRS ports according to the respective cyclic shifts.

In some examples, the SRS port division component 840 may be configured as or otherwise support a means for dividing the set of multiple SRS ports into the first subset of SRS ports and the second subset of SRS ports, the first subset of SRS ports being associated with a first set of port indices, and the second subset of SRS ports being associated with a second set of port indices. In some examples, the SRS port index component 845 may be configured as or otherwise support a means for setting the second set of port indices equal to the first set of port indices, where mapping each SRS port of the first subset of SRS ports to a respective cyclic shift and mapping each SRS port of the second subset of SRS ports to a respective cyclic shift is based on setting the second set of port indices equal to the first set of port indices.

In some examples, to support mapping, the SRS port mapping component 830 may be configured as or otherwise support a means for mapping each SRS port of the first subset of SRS ports to the first frequency resource comb and each SRS port of the second subset of SRS ports to the second frequency resource comb.

In some examples, a first comb offset, a first comb pattern, or both associated with the first frequency resource comb is different than a second comb offset, a second comb pattern, or both associated with the second frequency resource comb.

In some examples, to support mapping, the SRS port mapping component 830 may be configured as or otherwise support a means for mapping a third subset of SRS ports of the set of multiple SRS ports to a third symbol of the quantity of symbols. In some examples, to support mapping, the communication component 825 may be configured as or otherwise support a means for transmitting SRS using the third subset of SRS ports via the third symbol according to a third frequency resource comb of the quantity of frequency resource combs.

In some examples, the control signaling is received as a radio resource control message.

Figure 9:
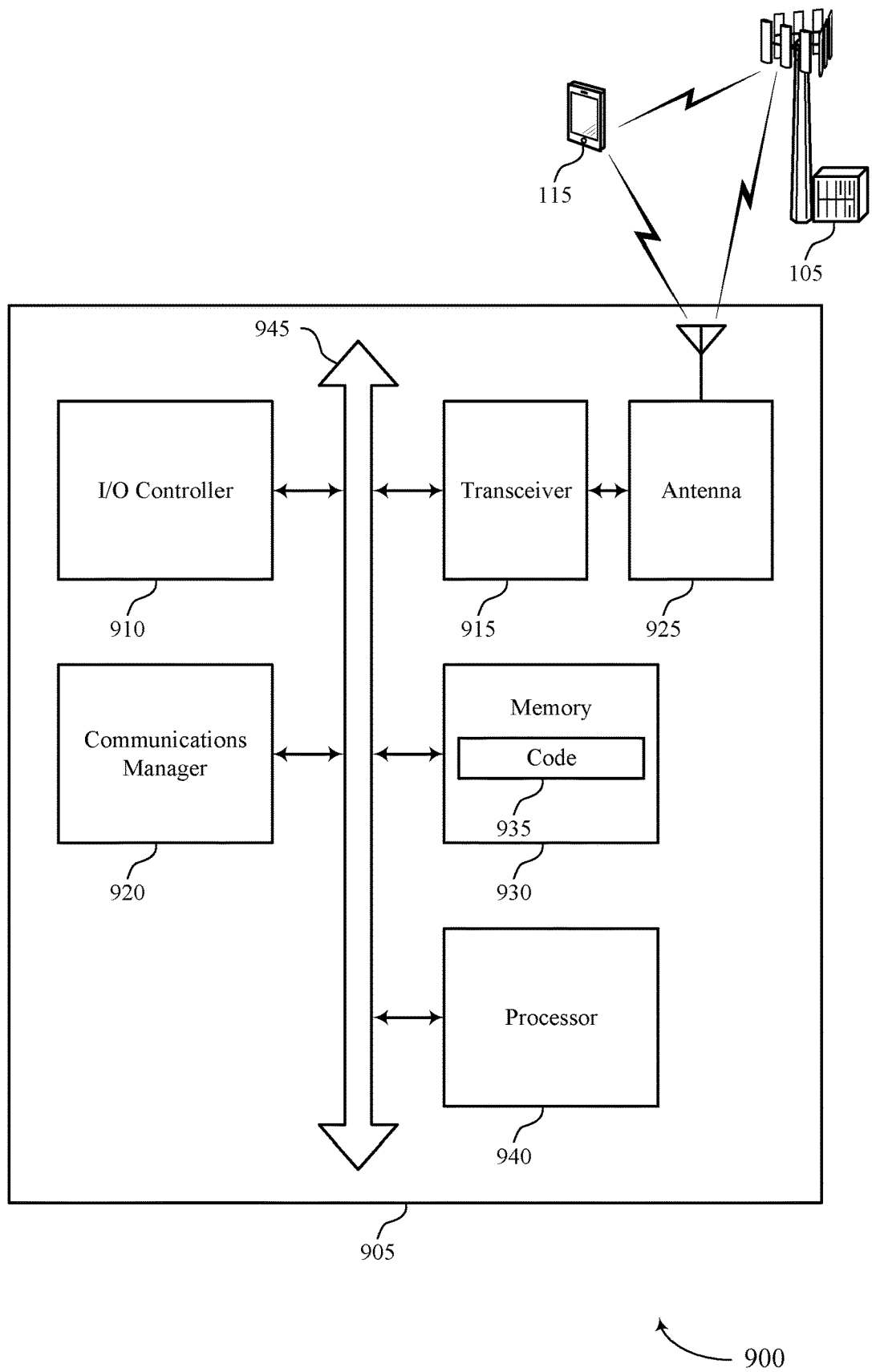
FIG. 9 shows a diagram of a system including a device that supports SRS port enhancements for uplink transmissions in accordance with one or more aspects of the present disclosure.

FIG. 9 shows a diagram of a system 900 including a device 905 that supports SRS port enhancements for uplink transmissions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting SRS port enhancements for uplink transmissions). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The communications manager 920 may be configured as or otherwise support a means for mapping a first subset of SRS ports of the set of multiple SRS ports to a first symbol of the quantity of symbols and a second subset of SRS ports of the set of multiple SRS ports to a second symbol of the quantity of symbols. The communications manager 920 may be configured as or otherwise support a means for transmitting SRS using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

By including or configuring the communications manager 920 in accordance with examples as described herein, the device 905 may support techniques for improved communication reliability, reduced latency, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of SRS port enhancements for uplink transmissions as described herein, or the processor 940 and the memory 930 may be otherwise configured to perform or support such operations.

Figure 10:
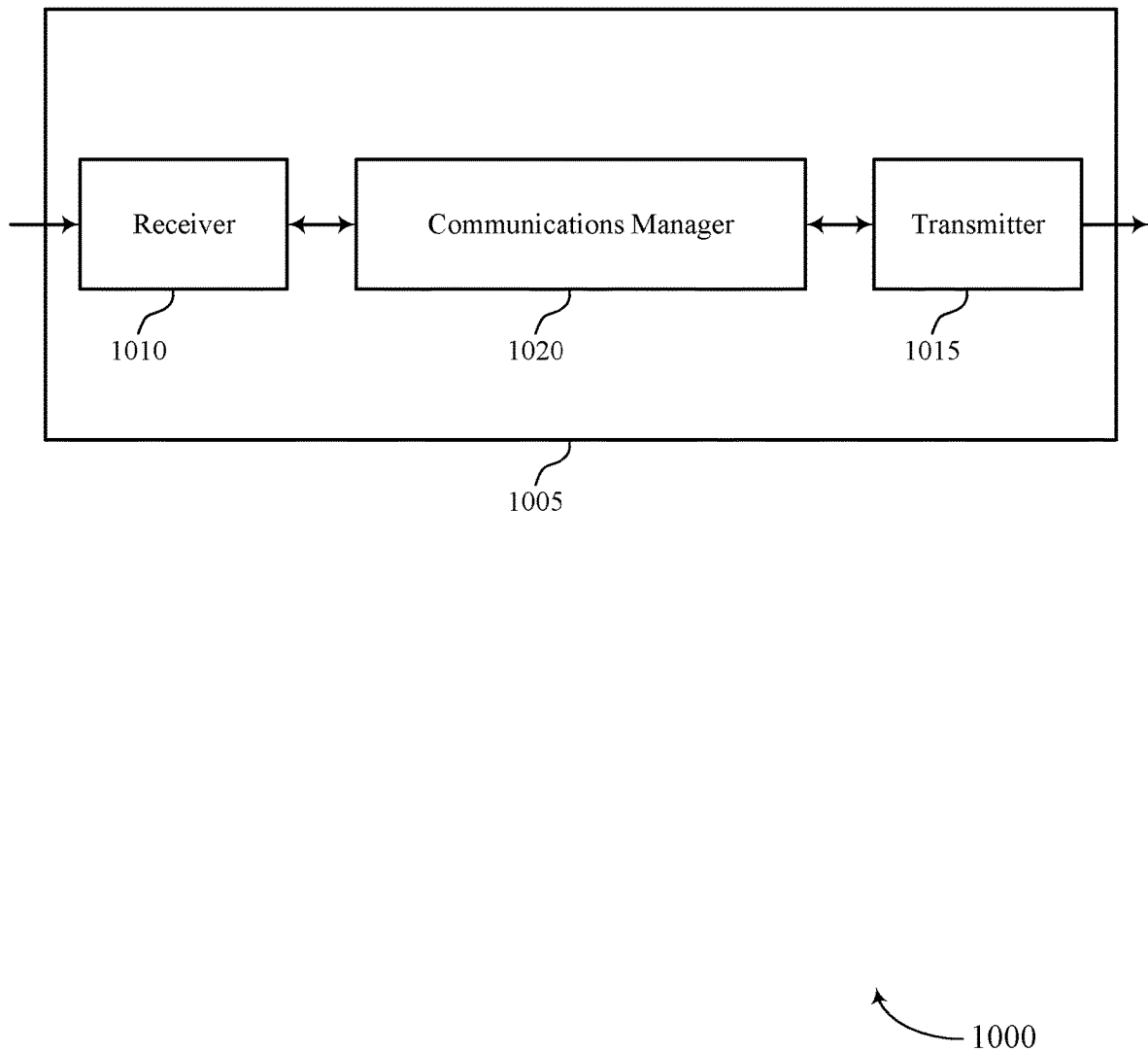
FIGS. 10 and 11 show block diagrams of devices that support SRS port enhancements for uplink transmissions in accordance with one or more aspects of the present disclosure.

FIG. 10 shows a block diagram 1000 of a device 1005 that supports SRS port enhancements for uplink transmissions in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of SRS port enhancements for uplink transmissions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. The communications manager 1020 may be configured as or otherwise support a means for obtaining SRS associated with a first subset of SRS ports via a first symbol according to a first frequency resource comb of the quantity of frequency resource combs. The communications manager 1020 may be configured as or otherwise support a means for obtaining SRS associated with a second subset of SRS ports via a second symbol according to a second frequency resource comb of the quantity of frequency resource combs.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
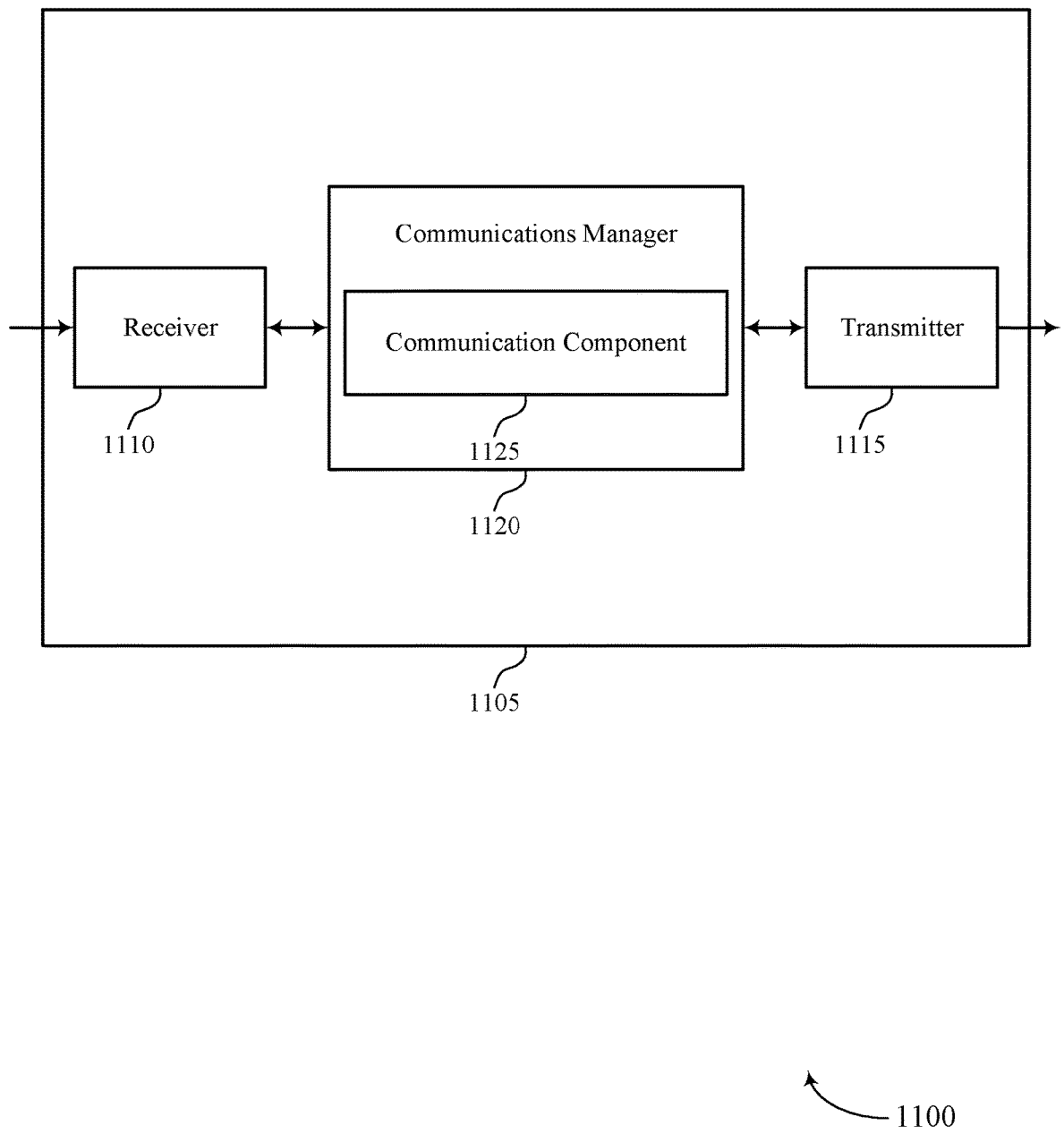

FIG. 11 shows a block diagram 1100 of a device 1105 that supports SRS port enhancements for uplink transmissions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of SRS port enhancements for uplink transmissions as described herein. For example, the communications manager 1120 may include a communication component 1125, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The communication component 1125 may be configured as or otherwise support a means for outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. The communication component 1125 may be configured as or otherwise support a means for obtaining SRS associated with a first subset of SRS ports via a first symbol according to a first frequency resource comb of the quantity of frequency resource combs. The communication component 1125 may be configured as or otherwise support a means for obtaining SRS associated with a second subset of SRS ports via a second symbol according to a second frequency resource comb of the quantity of frequency resource combs.

Figure 12:
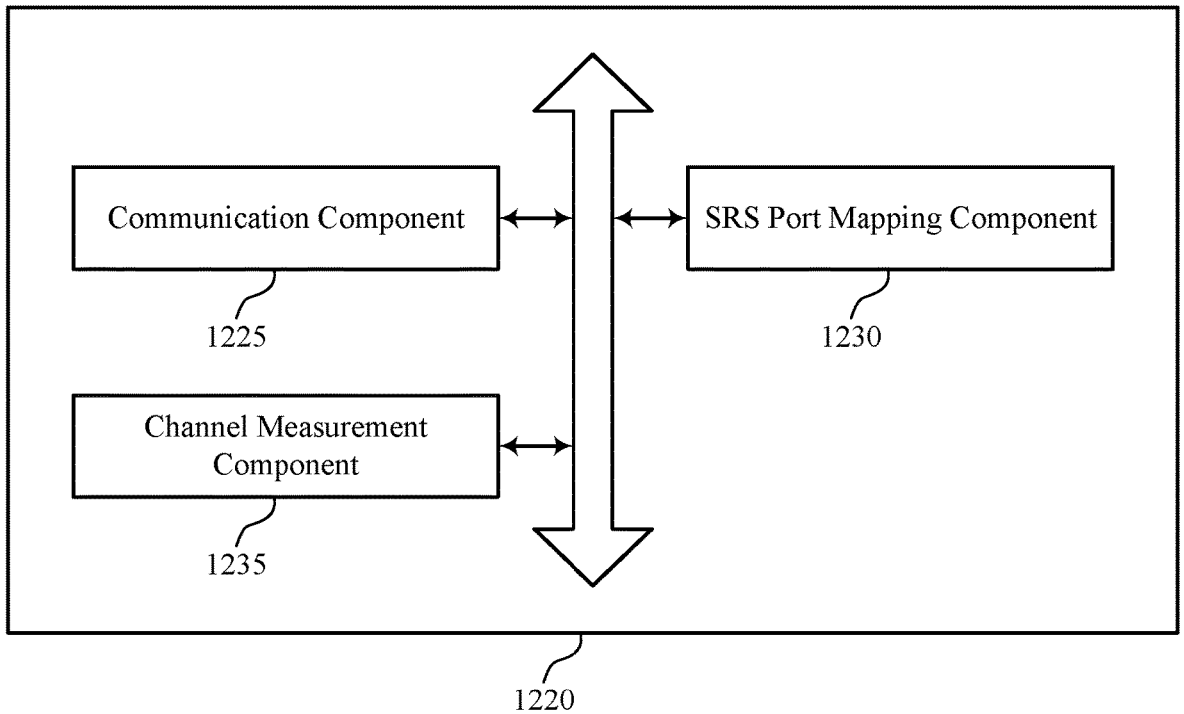
FIG. 12 shows a block diagram of a communications manager that supports SRS port enhancements for uplink transmissions in accordance with one or more aspects of the present disclosure.

FIG. 12 shows a block diagram 1200 of a communications manager 1220 that supports SRS port enhancements for uplink transmissions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of SRS port enhancements for uplink transmissions as described herein. For example, the communications manager 1220 may include a communication component 1225, an SRS port mapping component 1230, a channel measurement component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The communication component 1225 may be configured as or otherwise support a means for outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. In some examples, the communication component 1225 may be configured as or otherwise support a means for obtaining SRS associated with a first subset of SRS ports via a first symbol according to a first frequency resource comb of the quantity of frequency resource combs. In some examples, the communication component 1225 may be configured as or otherwise support a means for obtaining SRS associated with a second subset of SRS ports via a second symbol according to a second frequency resource comb of the quantity of frequency resource combs.

In some examples, the communication component 1225 may be configured as or otherwise support a means for outputting control signaling including an indication of a threshold quantity of cyclic shifts for the quantity of symbols.

In some examples, to support obtaining the SRS, the communication component 1225 may be configured as or otherwise support a means for obtaining the SRS from the set of multiple SRS ports, each SRS port mapped to a respective cyclic shift based on the threshold quantity of cyclic shifts.

In some examples, the SRS port mapping component 1230 may be configured as or otherwise support a means for mapping each SRS port of the first subset of SRS ports to the first frequency resource comb and each SRS port of the second subset of SRS ports to the second frequency resource comb, where obtaining the SRS is based on the mapping.

In some examples, the channel measurement component 1235 may be configured as or otherwise support a means for performing channel measurements based on obtaining the SRS associated with the first subset of SRS ports and the second subset of SRS ports.

In some examples, a first comb offset, a first comb pattern, or both associated with the first frequency resource comb is different than a second comb offset, a second comb pattern, or both associated with the second frequency resource comb.

In some examples, the control signaling is output as a radio resource control message.

Figure 13:
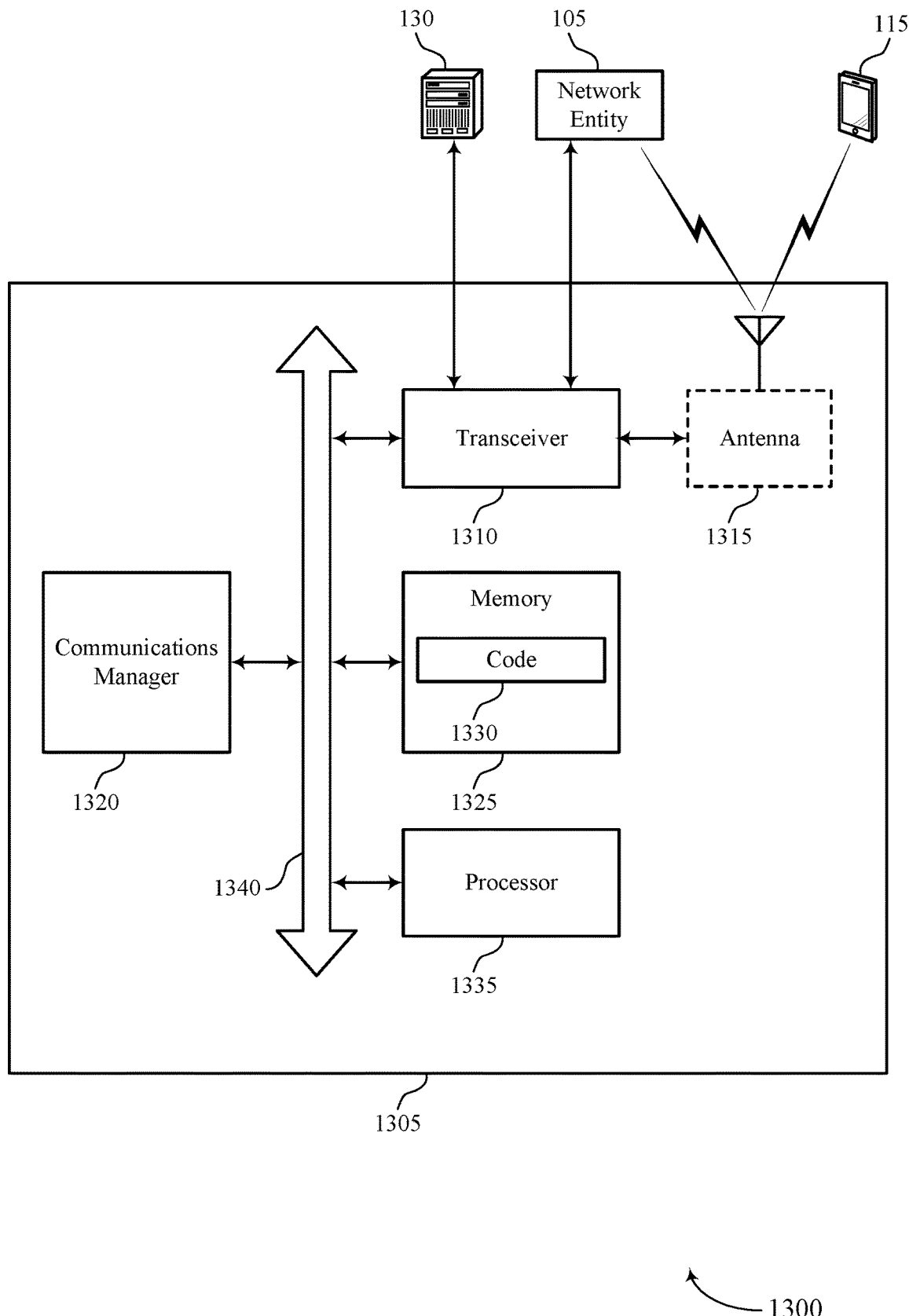
FIG. 13 shows a diagram of a system including a device that supports SRS port enhancements for uplink transmissions in accordance with one or more aspects of the present disclosure.

FIG. 13 shows a diagram of a system 1300 including a device 1305 that supports SRS port enhancements for uplink transmissions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a GPU, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting SRS port enhancements for uplink transmissions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. The communications manager 1320 may be configured as or otherwise support a means for obtaining SRS associated with a first subset of SRS ports via a first symbol according to a first frequency resource comb of the quantity of frequency resource combs. The communications manager 1320 may be configured as or otherwise support a means for obtaining SRS associated with a second subset of SRS ports via a second symbol according to a second frequency resource comb of the quantity of frequency resource combs.

By including or configuring the communications manager 1320 in accordance with examples as described herein, the device 1305 may support techniques for improved communication reliability, reduced latency, and more efficient utilization of communication resources In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of SRS port enhancements for uplink transmissions as described herein, or the processor 1335 and the memory 1325 may be otherwise configured to perform or support such operations.

Figure 14:
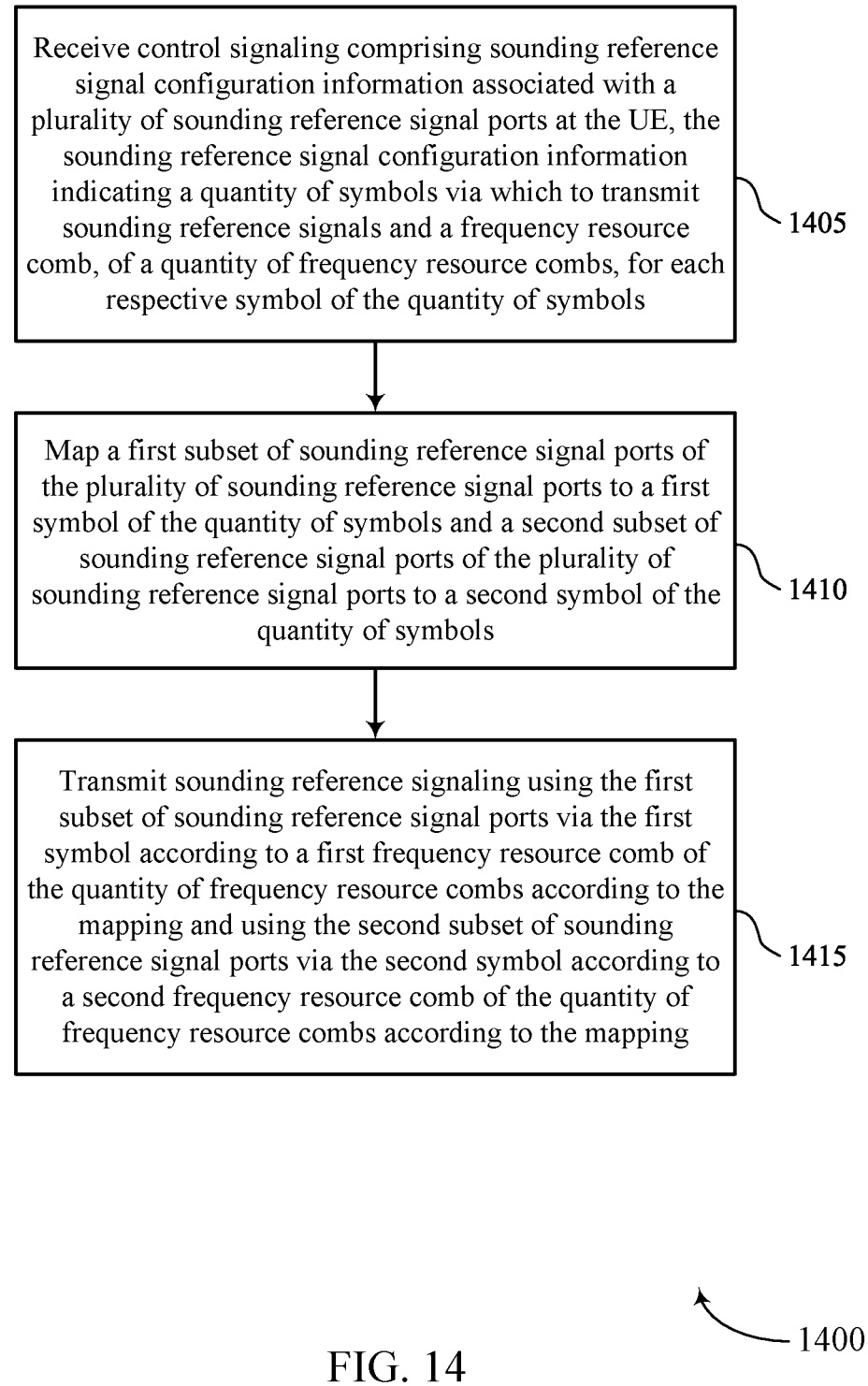
FIGS. 14 through 17 show flowcharts illustrating methods that support SRS port enhancements for uplink transmissions in accordance with one or more aspects of the present disclosure.

FIG. 14 shows a flowchart illustrating a method 1400 that supports SRS port enhancements for uplink transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The operations of 1405 may be performed in accordance with examples as disclosed herein. In some examples, aspects of the operations of 1405 may be performed by a communication component 825 as described with reference to FIG. 8.

At 1410, the method may include mapping a first subset of SRS ports of the set of multiple SRS ports to a first symbol of the quantity of symbols and a second subset of SRS ports of the set of multiple SRS ports to a second symbol of the quantity of symbols. The operations of 1410 may be performed in accordance with examples as disclosed herein. In some examples, aspects of the operations of 1410 may be performed by an SRS port mapping component 830 as described with reference to FIG. 8.

At 1415, the method may include transmitting sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping. The operations of 1415 may be performed in accordance with examples as disclosed herein. In some examples, aspects of the operations of 1415 may be performed by a communication component 825 as described with reference to FIG. 8.

Figure 15:
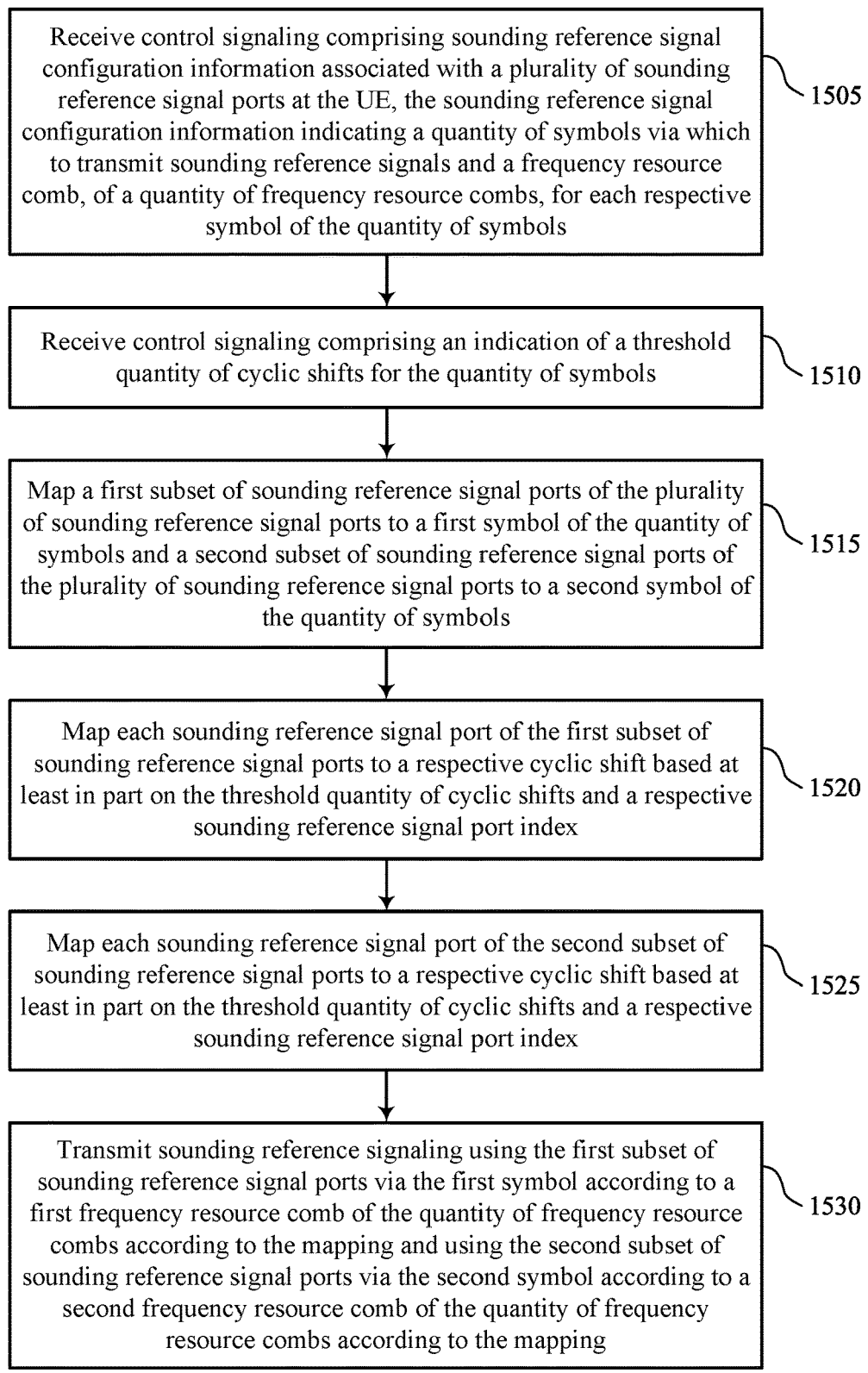

FIG. 15 shows a flowchart illustrating a method 1500 that supports SRS port enhancements for uplink transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling including SRS configuration information associated with a set of multiple SRS ports at the UE, the SRS configuration information indicating a quantity of symbols via which to transmit SRSs and a frequency resource comb, of a quantity of frequency resource combs, for each respective symbol of the quantity of symbols. The operations of 1505 may be performed in accordance with examples as disclosed herein. In some examples, aspects of the operations of 1505 may be performed by a communication component 825 as described with reference to FIG. 8.

At 1510, the method may include receiving control signaling including an indication of a threshold quantity of cyclic shifts for the quantity of symbols. The operations of 1510 may be performed in accordance with examples as disclosed herein. In some examples, aspects of the operations of 1510 may be performed by a communication component 825 as described with reference to FIG. 8.

At 1515, the method may include mapping a first subset of SRS ports of the set of multiple SRS ports to a first symbol of the quantity of symbols and a second subset of SRS ports of the set of multiple SRS ports to a second symbol of the quantity of symbols. The operations of 1515 may be performed in accordance with examples as disclosed herein. In some examples, aspects of the operations of 1515 may be performed by an SRS port mapping component 830 as described with reference to FIG. 8.

At 1520, the method may include mapping each SRS port of the first subset of SRS ports to a respective cyclic shift based at least in part on the threshold quantity of cyclic shifts and a respective SRS port index. The operations of 1520 may be performed in accordance with examples as disclosed herein. In some examples, aspects of the operations of 1520 may be performed by an SRS port mapping component 830 as described with reference to FIG. 8.

At 1525, the method may include mapping each SRS port of the second subset of SRS ports to a respective cyclic shift based at least in part on the threshold quantity of cyclic shifts and a respective SRS port index. The operations of 1525 may be performed in accordance with examples as disclosed herein. In some examples, aspects of the operations of 1525 may be performed by an SRS port mapping component 830 as described with reference to FIG. 8.

At 1530, the method may include transmitting sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping. The operations of 1530 may be performed in accordance with examples as disclosed herein. In some examples, aspects of the operations of 1530 may be performed by a communication component 825 as described with reference to FIG. 8.

Figure 16:
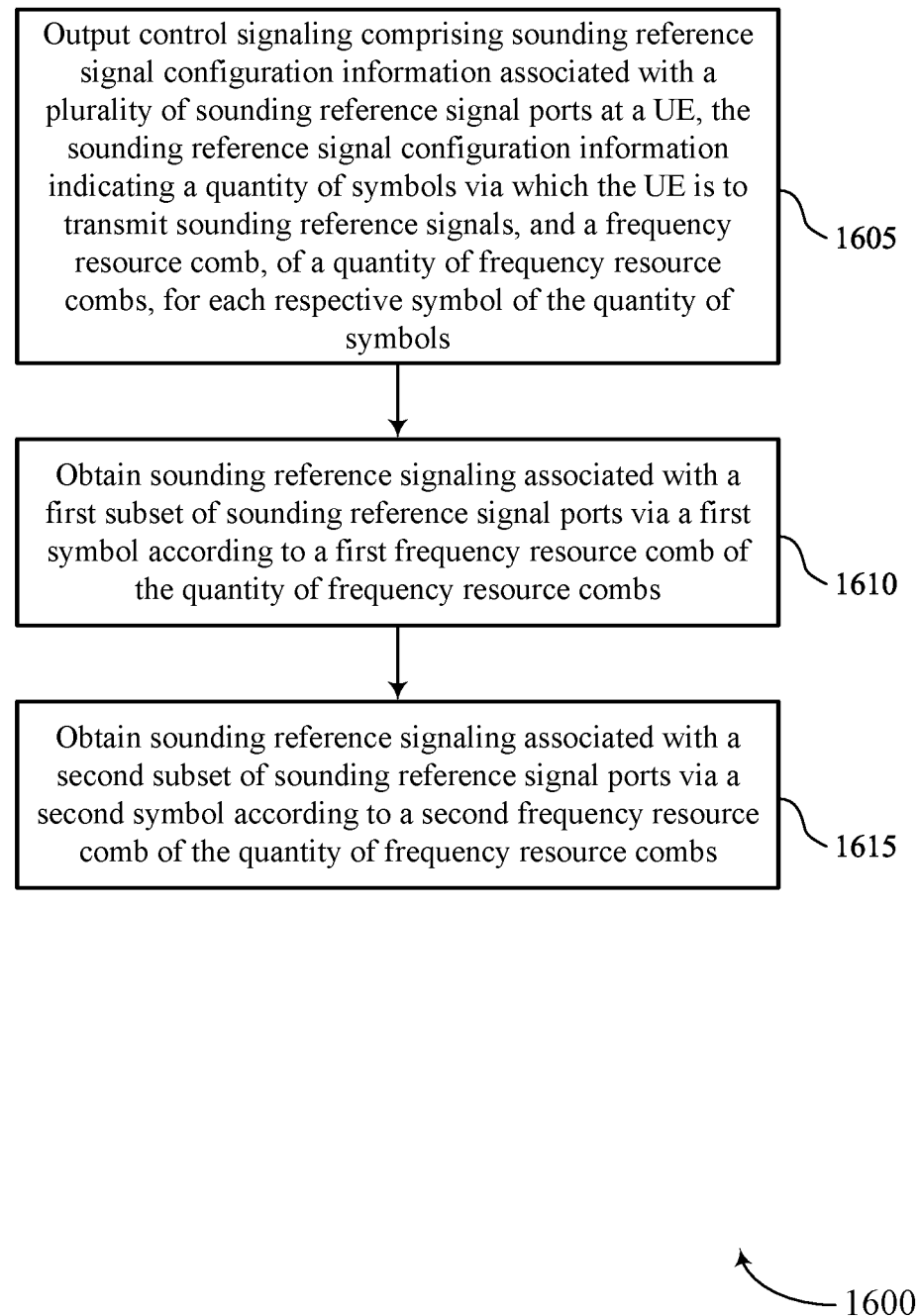

FIG. 16 shows a flowchart illustrating a method 1600 that supports SRS port enhancements for uplink transmissions in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. The operations of 1605 may be performed in accordance with examples as disclosed herein. In some examples, aspects of the operations of 1605 may be performed by a communication component 1225 as described with reference to FIG. 12.

At 1610, the method may include obtaining sounding reference signaling associated with a first subset of SRS ports via a first symbol according to a first frequency resource comb of the quantity of frequency resource combs. The operations of 1610 may be performed in accordance with examples as disclosed herein. In some examples, aspects of the operations of 1610 may be performed by a communication component 1225 as described with reference to FIG. 12.

At 1615, the method may include obtaining sounding reference signaling associated with a second subset of SRS ports via a second symbol according to a second frequency resource comb of the quantity of frequency resource combs. The operations of 1615 may be performed in accordance with examples as disclosed herein. In some examples, aspects of the operations of 1615 may be performed by a communication component 1225 as described with reference to FIG. 12.

Figure 17:
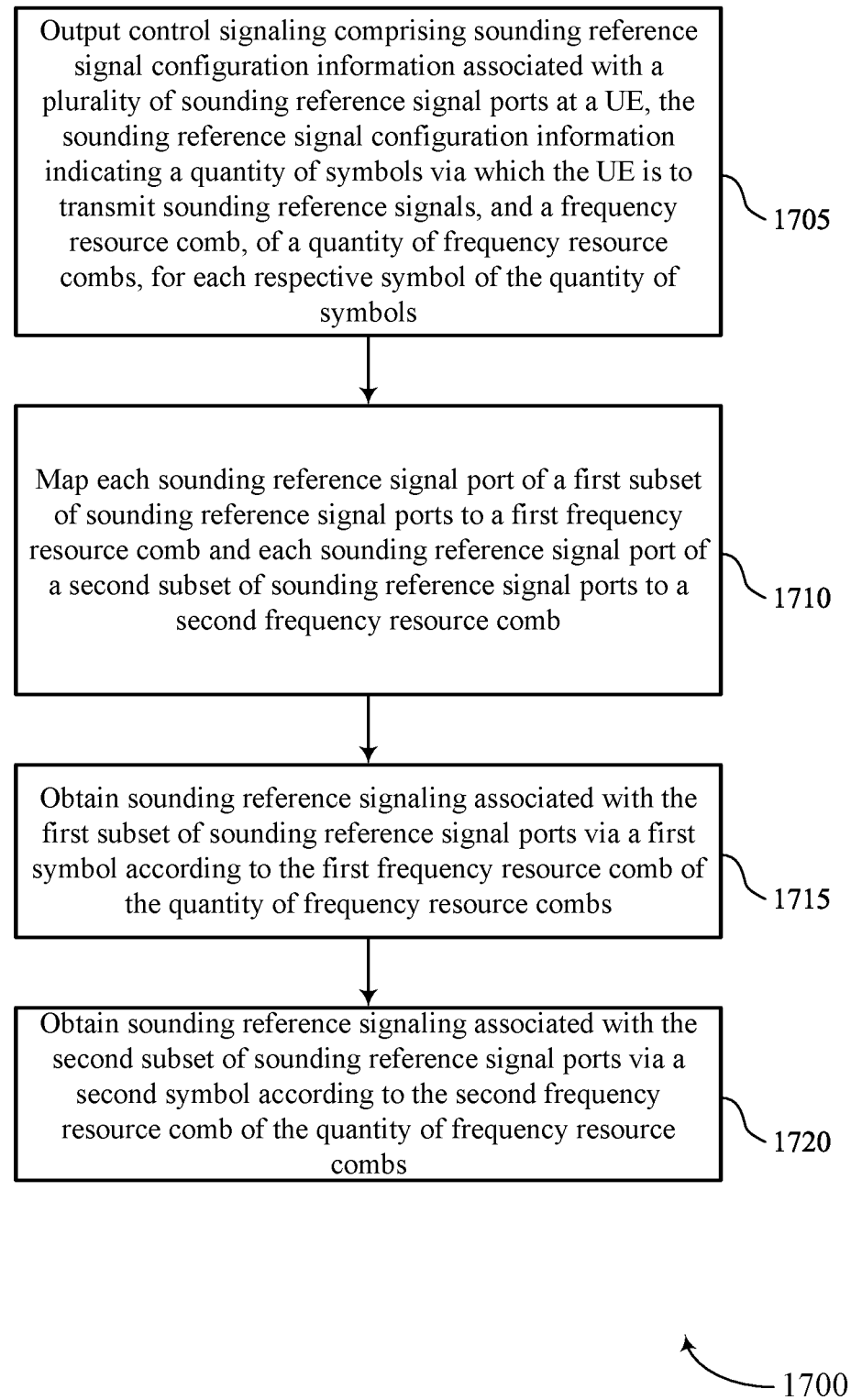

FIG. 17 shows a flowchart illustrating a method 1700 that supports SRS port enhancements for uplink transmissions in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling including SRS configuration information associated with a set of multiple SRS ports at a UE, the SRS configuration information indicating a quantity of symbols via which the UE is to transmit SRSs, and a frequency resource comb, of a quantity of frequency resource combs, for each respective symbol of the quantity of symbols. The operations of 1705 may be performed in accordance with examples as disclosed herein. In some examples, aspects of the operations of 1705 may be performed by a communication component 1225 as described with reference to FIG. 12.

At 1710, the method may include mapping each SRS port of a first subset of SRS ports to a first frequency resource comb and each SRS port of a second subset of SRS ports to a second frequency resource comb. The operations of 1710 may be performed in accordance with examples as disclosed herein. In some examples, aspects of the operations of 1710 may be performed by an SRS port mapping component 1230 as described with reference to FIG. 12.

At 1715, the method may include obtaining sounding reference signaling associated with the first subset of SRS ports via a first symbol according to the first frequency resource comb of the quantity of frequency resource combs. The operations of 1715 may be performed in accordance with examples as disclosed herein. In some examples, aspects of the operations of 1715 may be performed by a communication component 1225 as described with reference to FIG. 12.

At 1720, the method may include obtaining sounding reference signaling associated with the second subset of SRS ports via a second symbol according to the second frequency resource comb of the quantity of frequency resource combs. The operations of 1720 may be performed in accordance with examples as disclosed herein. In some examples, aspects of the operations of 1720 may be performed by a communication component 1225 as described with reference to FIG. 12.

The following provides an overview of aspects of the present disclosure:

Aspect 1: A method for wireless communications at a UE, comprising: receiving control signaling comprising SRS configuration information associated with a plurality of SRS ports at the UE, the SRS configuration information indicating a quantity of symbols via which to transmit SRSs and a frequency resource comb, of a quantity of frequency resource combs, for each respective symbol of the quantity of symbols; mapping a first subset of SRS ports of the plurality of SRS ports to a first symbol of the quantity of symbols and a second subset of SRS ports of the plurality of SRS ports to a second symbol of the quantity of symbols; and transmitting sounding reference signaling using the first subset of SRS ports via the first symbol according to a first frequency resource comb of the quantity of frequency resource combs according to the mapping and using the second subset of SRS ports via the second symbol according to a second frequency resource comb of the quantity of frequency resource combs according to the mapping.

Aspect 2: The method of aspect 1, further comprising: receiving control signaling comprising an indication of a threshold quantity of cyclic shifts for the quantity of symbols; mapping each SRS port of the first subset of SRS ports to a respective cyclic shift based at least in part on the threshold quantity of cyclic shifts and a respective SRS port index; and mapping each SRS port of the second subset of SRS ports to a respective cyclic shift based at least in part on the threshold quantity of cyclic shifts and a respective SRS port index.

Aspect 3: The method of aspect 2, wherein transmitting the sounding reference signaling comprises: sounding each SRS port of the first subset of SRS ports and each SRS port of the second subset of SRS ports according to the respective cyclic shifts.

Aspect 4: The method of any of aspects 2 through 3, further comprising: dividing the plurality of SRS ports into the first subset of SRS ports and the second subset of SRS ports, the first subset of SRS ports being associated with a first set of port indices, and the second subset of SRS ports being associated with a second set of port indices; and setting the second set of port indices equal to the first set of port indices, wherein mapping each SRS port of the first subset of SRS ports to a respective cyclic shift and mapping each SRS port of the second subset of SRS ports to a respective cyclic shift is based at least in part on setting the second set of port indices equal to the first set of port indices.

Aspect 5: The method of any of aspects 1 through 4, wherein the mapping comprises: mapping each SRS port of the first subset of SRS ports to the first frequency resource comb and each SRS port of the second subset of SRS ports to the second frequency resource comb.

Aspect 6: The method of aspect 5, wherein a first comb offset, a first comb pattern, or both associated with the first frequency resource comb is different than a second comb offset, a second comb pattern, or both associated with the second frequency resource comb.

Aspect 7: The method of any of aspects 1 through 6, wherein the mapping comprises: mapping a third subset of SRS ports of the plurality of SRS ports to a third symbol of the quantity of symbols; and transmitting sounding reference signaling using the third subset of SRS ports via the third symbol according to a third frequency resource comb of the quantity of frequency resource combs.

Aspect 8: The method of any of aspects 1 through 7, wherein the control signaling is received as a radio resource control message.

Aspect 9: A method for wireless communications at a network entity, comprising: outputting control signaling comprising SRS configuration information associated with a plurality of SRS ports at a UE, the SRS configuration information indicating a quantity of symbols via which the UE is to transmit SRSs, and a frequency resource comb, of a quantity of frequency resource combs, for each respective symbol of the quantity of symbols; obtaining sounding reference signaling associated with a first subset of SRS ports via a first symbol according to a first frequency resource comb of the quantity of frequency resource combs; and obtaining sounding reference signaling associated with a second subset of SRS ports via a second symbol according to a second frequency resource comb of the quantity of frequency resource combs.

Aspect 10: The method of aspect 9, further comprising: outputting control signaling comprising an indication of a threshold quantity of cyclic shifts for the quantity of symbols.

Aspect 11: The method of aspect 10, wherein obtaining the sounding reference signaling comprises: obtaining the sounding reference signaling from the plurality of SRS ports, each SRS port mapped to a respective cyclic shift based at least in part on the threshold quantity of cyclic shifts.

Aspect 12: The method of any of aspects 9 through 11, further comprising: mapping each SRS port of the first subset of SRS ports to the first frequency resource comb and each SRS port of the second subset of SRS ports to the second frequency resource comb, wherein obtaining the sounding reference signaling is based at least in part on the mapping.

Aspect 13: The method of any of aspects 9 through 12, further comprising: performing channel measurements based at least in part on obtaining the sounding reference signaling associated with the first subset of SRS ports and the second subset of SRS ports.

Aspect 14: The method of any of aspects 9 through 13, wherein a first comb offset, a first comb pattern, or both associated with the first frequency resource comb is different than a second comb offset, a second comb pattern, or both associated with the second frequency resource comb.

Aspect 15: The method of any of aspects 9 through 14, wherein the control signaling is output as a radio resource control message.

Aspect 16: An apparatus for wireless communications at a UE, comprising at least one processor; memory coupled with the at least one processor; and instructions stored in the memory and executable by the at least one processor to cause the apparatus to perform a method of any of aspects 1 through 8.

Aspect 17: An apparatus for wireless communications at a UE, comprising at least one means for performing a method of any of aspects 1 through 8.

Aspect 18: A non-transitory computer-readable medium storing code for wireless communications at a UE, the code comprising instructions executable by at least one processor to perform a method of any of aspects 1 through 8.

Aspect 19: An apparatus for wireless communications at a network entity, comprising at least one processor; memory coupled with the at least one processor; and instructions stored in the memory and executable by the at least one processor to cause the apparatus to perform a method of any of aspects 9 through 15.

Aspect 20: An apparatus for wireless communications at a network entity, comprising at least one means for performing a method of any of aspects 9 through 15.

Aspect 21: A non-transitory computer-readable medium storing code for wireless communications at a network entity, the code comprising instructions executable by at least one processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
at least one processor; and
one or more memories coupled with the at least one processor, the one or more memories storing instructions executable by the at least one processor, directly or after compilation, to cause the UE to:
receive control signaling comprising sounding reference signal configuration information associated with a plurality of sounding reference signal ports at the UE, the sounding reference signal configuration information indicating a quantity of symbols via which to transmit sounding reference signals and indicating a respective frequency resource pattern for each respective symbol of the quantity of symbols, each respective frequency resource pattern being one of a quantity of frequency resource patterns;
map a first subset of sounding reference signal ports of the plurality of sounding reference signal ports to a first symbol of the quantity of symbols and a second subset of sounding reference signal ports of the plurality of sounding reference signal ports to a second symbol of the quantity of symbols; and
transmit sounding reference signaling using the first subset of sounding reference signal ports via the first symbol according to a first frequency resource pattern of the quantity of frequency resource patterns according to the mapping and using the second subset of sounding reference signal ports via the second symbol according to a second frequency resource pattern of the quantity of frequency resource patterns according to the mapping.

2. The apparatus of claim 1, wherein the instructions are further executable by the at least one processor, directly or after compilation, to cause the UE to:
receive control signaling comprising an indication of a threshold quantity of cyclic shifts for the quantity of symbols;
map each sounding reference signal port of the first subset of sounding reference signal ports to a respective cyclic shift based at least in part on the threshold quantity of cyclic shifts and a respective sounding reference signal port index; and
map each sounding reference signal port of the second subset of sounding reference signal ports to a respective cyclic shift based at least in part on the threshold quantity of cyclic shifts and a respective sounding reference signal port index.

3. The apparatus of claim 2, wherein the instructions to transmit the sounding reference signaling are executable by the at least one processor, directly or after compilation, to cause the UE to:
sound each sounding reference signal port of the first subset of sounding reference signal ports and each sounding reference signal port of the second subset of sounding reference signal ports according to the respective cyclic shifts.

4. The apparatus of claim 2, wherein the instructions are further executable by the at least one processor, directly or after compilation, to cause the UE to:
divide the plurality of sounding reference signal ports into the first subset of sounding reference signal ports and the second subset of sounding reference signal ports, the first subset of sounding reference signal ports being associated with a first set of port indices, and the second subset of sounding reference signal ports being associated with a second set of port indices; and
set the second set of port indices equal to the first set of port indices, wherein mapping each sounding reference signal port of the first subset of sounding reference signal ports to a respective cyclic shift and mapping each sounding reference signal port of the second subset of sounding reference signal ports to a respective cyclic shift is based at least in part on setting the second set of port indices equal to the first set of port indices.

5. The apparatus of claim 1, wherein the instructions to mapping are executable by the at least one processor, directly or after compilation, to cause the UE to:
map each sounding reference signal port of the first subset of sounding reference signal ports to the first frequency resource pattern and each sounding reference signal port of the second subset of sounding reference signal ports to the second frequency resource pattern.

6. The apparatus of claim 5, wherein a first offset, a first pattern, or both associated with the first frequency resource pattern is different than a second offset, a second pattern, or both associated with the second frequency resource pattern.

7. The apparatus of claim 1, wherein the instructions to mapping are executable by the at least one processor, directly or after compilation, to cause the UE to:
map a third subset of sounding reference signal ports of the plurality of sounding reference signal ports to a third symbol of the quantity of symbols; and
transmit sounding reference signaling using the third subset of sounding reference signal ports via the third symbol according to a third frequency resource pattern of the quantity of frequency resource patterns.

8. The apparatus of claim 1, wherein the control signaling is received as a radio resource control message.

9. An apparatus for wireless communications at a network entity, comprising:
at least one processor; and
one or more memories coupled with the at least one processor, the one or more memories storing instructions executable by the at least one processor, directly or after compilation, to cause the network entity to:
output control signaling comprising sounding reference signal configuration information associated with a plurality of sounding reference signal ports at a user equipment (UE), the sounding reference signal configuration information indicating a quantity of symbols via which the UE is to transmit sounding reference signals, and indicating a respective frequency resource pattern for each respective symbol of the quantity of symbols, each respective frequency resource pattern being one of a quantity of frequency resource patterns;
obtain sounding reference signaling associated with a first subset of sounding reference signal ports via a first symbol according to a first frequency resource pattern of the quantity of frequency resource patterns; and
obtain sounding reference signaling associated with a second subset of sounding reference signal ports via a second symbol according to a second frequency resource pattern of the quantity of frequency resource patterns.

10. The apparatus of claim 9, wherein the instructions are further executable by the at least one processor, directly or after compilation, to cause the network entity to:
output control signaling comprising an indication of a threshold quantity of cyclic shifts for the quantity of symbols.

11. The apparatus of claim 10, wherein the instructions to obtain the sounding reference signaling are executable by the at least one processor, directly or after compilation, to cause the network entity to:
obtain the sounding reference signaling from the plurality of sounding reference signal ports, each sounding reference signal port mapped to a respective cyclic shift based at least in part on the threshold quantity of cyclic shifts.

12. The apparatus of claim 9, wherein the instructions are further executable by the at least one processor, directly or after compilation, to cause the network entity to:
map each sounding reference signal port of the first subset of sounding reference signal ports to the first frequency resource pattern and each sounding reference signal port of the second subset of sounding reference signal ports to the second frequency resource pattern, wherein obtaining the sounding reference signaling is based at least in part on the mapping.

13. The apparatus of claim 9, wherein the instructions are further executable by the at least one processor, directly or after compilation, to cause the network entity to:
perform channel measurements based at least in part on obtaining the sounding reference signaling associated with the first subset of sounding reference signal ports and the second subset of sounding reference signal ports.

14. The apparatus of claim 9, wherein a first offset, a first pattern, or both associated with the first frequency resource pattern is different than a second offset, a second pattern, or both associated with the second frequency resource pattern.

15. The apparatus of claim 9, wherein the control signaling is output as a radio resource control message.

16. A method for wireless communications at a user equipment (UE), comprising:
receiving control signaling comprising sounding reference signal configuration information associated with a plurality of sounding reference signal ports at the UE, the sounding reference signal configuration information indicating a quantity of symbols via which to transmit sounding reference signals and indicating a respective frequency resource pattern for each respective symbol of the quantity of symbols, each respective frequency resource pattern being one of a quantity of frequency resource patterns;
mapping a first subset of sounding reference signal ports of the plurality of sounding reference signal ports to a first symbol of the quantity of symbols and a second subset of sounding reference signal ports of the plurality of sounding reference signal ports to a second symbol of the quantity of symbols; and transmitting sounding reference signaling using the first subset of sounding reference signal ports via the first symbol according to a first frequency resource pattern of the quantity of frequency resource patterns according to the mapping and using the second subset of sounding reference signal ports via the second symbol according to a second frequency resource pattern of the quantity of frequency resource patterns according to the mapping.

17. The method of claim 16, further comprising:

receiving control signaling comprising an indication of a threshold quantity of cyclic shifts for the quantity of symbols;

mapping each sounding reference signal port of the first subset of sounding reference signal ports to a respective cyclic shift based at least in part on the threshold quantity of cyclic shifts and a respective sounding reference signal port index; and mapping each sounding reference signal port of the second subset of sounding reference signal ports to a respective cyclic shift based at least in part on the threshold quantity of cyclic shifts and a respective sounding reference signal port index.

18. The method of claim 17, wherein transmitting the sounding reference signaling comprises:

sounding each sounding reference signal port of the first subset of sounding reference signal ports and each sounding reference signal port of the second subset of sounding reference signal ports according to the respective cyclic shifts.

19. The method of claim 17, further comprising:

dividing the plurality of sounding reference signal ports into the first subset of sounding reference signal ports and the second subset of sounding reference signal ports, the first subset of sounding reference signal ports being associated with a first set of port indices, and the second subset of sounding reference signal ports being associated with a second set of port indices; and setting the second set of port indices equal to the first set of port indices, wherein mapping each sounding reference signal port of the first subset of sounding reference signal ports to a respective cyclic shift and mapping each sounding reference signal port of the second subset of sounding reference signal ports to a respective cyclic shift is based at least in part on setting the second set of port indices equal to the first set of port indices.

20. The method of claim 16, wherein the mapping comprises:

mapping each sounding reference signal port of the first subset of sounding reference signal ports to the first frequency resource pattern and each sounding reference signal port of the second subset of sounding reference signal ports to the second frequency resource pattern.

21. The method of claim 20, wherein a first offset, a first pattern, or both associated with the first frequency resource pattern is different than a second offset, a second pattern, or both associated with the second frequency resource pattern.

22. The method of claim 16, wherein the mapping comprises:

mapping a third subset of sounding reference signal ports of the plurality of sounding reference signal ports to a third symbol of the quantity of symbols; and transmitting sounding reference signaling using the third subset of sounding reference signal ports via the third symbol according to a third frequency resource pattern of the quantity of frequency resource patterns.

23. The method of claim 16, wherein the control signaling is received as a radio resource control message.

24. A method for wireless communications at a network entity, comprising:

outputting control signaling comprising sounding reference signal configuration information associated with a plurality of sounding reference signal ports at a user equipment (UE), the sounding reference signal configuration information indicating a quantity of symbols via which the UE is to transmit sounding reference signals, and indicating a respective frequency resource pattern for each respective symbol of the quantity of symbols, each respective frequency resource pattern being one of a quantity of frequency resource patterns;

obtaining sounding reference signaling associated with a first subset of sounding reference signal ports via a first symbol according to a first frequency resource pattern of the quantity of frequency resource patterns; and obtaining sounding reference signaling associated with a second subset of sounding reference signal ports via a second symbol according to a second frequency resource pattern of the quantity of frequency resource patterns.

25. The method of claim 24, further comprising:

outputting control signaling comprising an indication of a threshold quantity of cyclic shifts for the quantity of symbols.

26. The method of claim 25, wherein obtaining the sounding reference signaling comprises:

obtaining the sounding reference signaling from the plurality of sounding reference signal ports, each sounding reference signal port mapped to a respective cyclic shift based at least in part on the threshold quantity of cyclic shifts.

27. The method of claim 24, further comprising:

mapping each sounding reference signal port of the first subset of sounding reference signal ports to the first frequency resource pattern and each sounding reference signal port of the second subset of sounding reference signal ports to the second frequency resource pattern, wherein obtaining the sounding reference signaling is based at least in part on the mapping.

28. The method of claim 24, further comprising:

performing channel measurements based at least in part on obtaining the sounding reference signaling associated with the first subset of sounding reference signal ports and the second subset of sounding reference signal ports.

29. The method of claim 24, wherein a first offset, a first pattern, or both associated with the first frequency resource pattern is different than a second offset, a second pattern, or both associated with the second frequency resource pattern.

30. The method of claim 24, wherein the control signaling is output as a radio resource control message.

* * * * *